(12) United States Patent
Arakane et al.

(10) Patent No.: US 10,953,661 B2
(45) Date of Patent: *Mar. 23, 2021

(54) IMAGE PROCESSING APPARATUS CAPABLE OF CORRECTING DRIVING INFORMATION, METHOD OF CONTROLLING IMAGE PROCESSING APPARATUS FOR DRIVING INFORMATION CORRECTION AND NON-TRANSITORY COMPUTER-READABLE RECORDING MEDIUM FOR IMAGE PROCESSING APPARATUS CAPABLE OF CORRECTING DRIVING INFORMATION

(71) Applicant: Brother Kogyo Kabushiki Kaisha, Nagoya (JP)

(72) Inventors: Satoru Arakane, Nagoya (JP); Yuka Hattori, Mizuho (JP); Kenji Kawamoto, Nagoya (JP); Tony Lee, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/532,827

(22) Filed: Aug. 6, 2019

(65) Prior Publication Data

US 2020/0047513 A1 Feb. 13, 2020

(30) Foreign Application Priority Data

Aug. 7, 2018 (JP) .............................. JP2018-148666

(51) Int. Cl.
*H04N 1/46* (2006.01)
*B41J 2/205* (2006.01)
(Continued)

(52) U.S. Cl.
CPC .......... *B41J 2/2052* (2013.01); *B41J 29/393* (2013.01); *H04N 1/047* (2013.01)

(58) Field of Classification Search
None
See application file for complete search history.

(56) References Cited

U.S. PATENT DOCUMENTS 6,883,892 B2 4/2005 Sievert
7,006,246 B1 2/2006 Nakajima
(Continued)

FOREIGN PATENT DOCUMENTS

JP 2004-358965 A 12/2004

OTHER PUBLICATIONS

Notice of Allowance, U.S. Appl. No. 16/532,912, dated Feb. 4, 2020 (11 pages).

(Continued)

*Primary Examiner* — Dung D Tran
(74) *Attorney, Agent, or Firm* — Burr & Brown, PLLC

(57) ABSTRACT

When a correction request is received, a printing correction pattern is printed. Thereafter, a screen prompting to scan the printed correction pattern is displayed. When the scan notification screen is displayed, if the scanning request is received, an image is scanned. Next, the driving information is corrected based on a scanned image. When a particular standby condition is satisfied without the scanning request being received, a process of setting non-completion information is performed. When a particular standby release condition is satisfied without the scanning request is received, a screen corresponding to the satisfied standby release condition is displayed at a particular timing. When the correction request is input when a screen different from the scan notification screen is displayed, information regarding necessity determination of the pattern printing process is (Continued)

received. When the pattern printing process is unnecessary, the notification displaying process is performed without performing the pattern printing process.

12 Claims, 15 Drawing Sheets

(51) Int. Cl.
    *B41J 29/393*     (2006.01)
    *H04N 1/047*     (2006.01)

(56) References Cited

U.S. PATENT DOCUMENTS

| | | |
|---|---|---|
| 8,531,727 B2 | 9/2013 | Komiya |
| 2005/0007404 A1 | 1/2005 | Usui |
| 2006/0119907 A1 | 6/2006 | Takahashi |
| 2006/0203309 A1 | 9/2006 | Hirayama |
| 2007/0285743 A1 | 12/2007 | Hirayama |
| 2009/0033957 A1* | 2/2009 | Hardy .................. H04N 1/6033 358/1.9 |
| 2011/0176155 A1 | 7/2011 | Toriyabe |
| 2014/0376036 A1 | 12/2014 | Sugi |

OTHER PUBLICATIONS

U.S. Appl. No. 16/532,912, filed Aug. 6, 2019, Arakane, Satoru, et al.

* cited by examiner

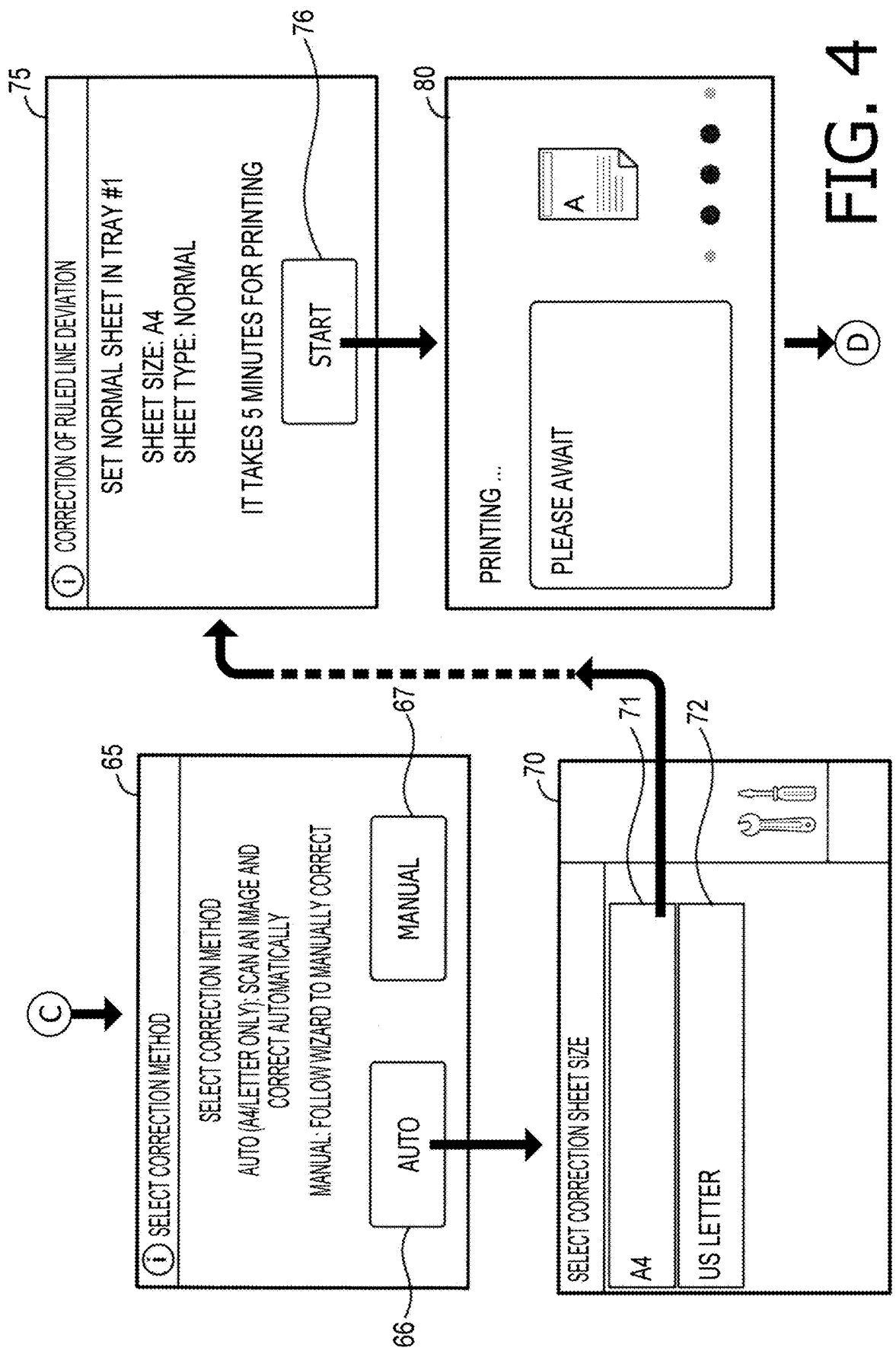

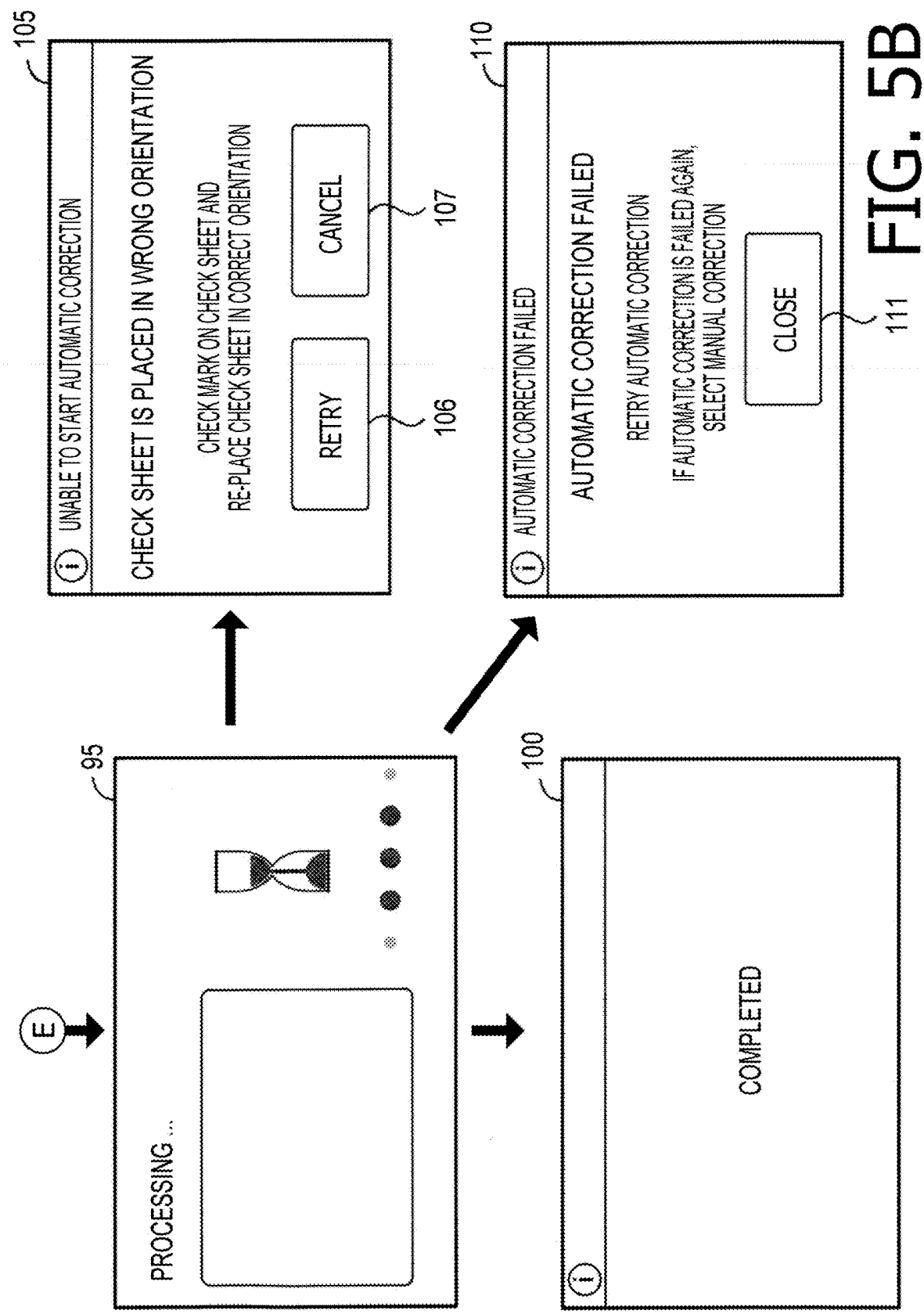

IMAGE PROCESSING APPARATUS CAPABLE OF CORRECTING DRIVING INFORMATION, METHOD OF CONTROLLING IMAGE PROCESSING APPARATUS FOR DRIVING INFORMATION CORRECTION AND NON-TRANSITORY COMPUTER-READABLE RECORDING MEDIUM FOR IMAGE PROCESSING APPARATUS CAPABLE OF CORRECTING DRIVING INFORMATION

CROSS-REFERENCE TO RELATED APPLICATIONS

This application claims priority under 35 U.S.C. § 119 from Japanese Patent Application No. 2018-148666 filed on Aug. 7, 2018. The entire subject matter of the application is incorporated herein by reference.

BACKGROUND

Technical Field

The present disclosures relate to an image processing apparatus, and more specifically to a technique of printing an image with use of the image processing apparatus. The present disclosures also relate to a method of controlling the image processing apparatus and a non-transitory computer-readable recording medium containing instructions which may be executed by a controller of the image processing apparatus.

Related Art

Conventionally, there has been known a printing device having a function of automatically correcting for setting values (e.g., an ink ejection amount, an ink ejection position and the like) which are used when printing is performed. According to such a printing device, when the automatic correction function is designated, a pattern for correction is printed on a printing sheet. After the pattern for correction is printed, a screen prompting a user to scan the pattern for correction is displayed. When the user sets the printing sheet on which the pattern for correction is printed (which will be referred to as a testing sheet) to a scanning device and instructs execution of scanning, scanning of the testing sheet is performed. Thereafter, based on a result of scanning, various setting values are corrected.

SUMMARY

It is noted that, when the pattern for correction is printed and the screen prompting the scanning is displayed but the user instruction to perform scanning is not input and a particular period is elapsed, it would be convenient if the screen is switched to another screen (e.g., a standby screen) so that another operation can be performed.

However, when the printing device is configured such that the screen is automatically switched to, for example, the standby screen when the particular period has elapsed without the instruction to scan the test sheet being input, the user, who intended to make the printing device execute the automatic correcting function, needs to perform the above-described operation from the beginning, which degrades usability of the printing device.

According to aspects of the present disclosures, there is provided an image processing apparatus, which is provided with an input section, a display, a storage, a printer configured to print an image on a recording medium, a scanner configured to scan an image and a controller. The controller is configured to perform a normal printing process of driving the printer based on driving information to print an image on the recording medium in accordance with print data, when a correction request of the driving information is input through the input section, a pattern printing process of printing correction pattern representing an image corresponding to the input correction request on the recording medium by driving the printer based on the driving information, after the correction pattern is printed in the pattern printing process, a notification displaying process of displaying a scan notification screen prompting to scan the printed correction pattern using the scanner, when the scan notification screen is being displayed on the display, a scanning request receiving process of receiving a scanning request of the printed correction pattern through the input section, when the scanning request is received in the scanning request receiving process, an image scanning process of scanning an image with the scanner, a correcting process of correcting the driving information based on a scanned image which is an image scanned in the image scanning process, when a particular standby condition is satisfied without the scanning request being received in the scanning request receiving process after the scan notification screen is displayed in the notification displaying process, an information setting process of setting non-completion information corresponding to the input correction request in the storage, when a particular standby release condition is satisfied without the scanning request is received in the scanning request receiving process after the scan notification screen is displayed in the notification displaying process, a screen switching process of displaying, on the display, a screen corresponding to the satisfied standby release condition instead of the scan notification screen at a particular timing after the standby release condition is satisfied, and when the correction request is input through the input section in a non-complete state in which the non-completion information is set in the storage and a screen different from the scan notification screen is being displayed on the display, a necessity determination receiving process of receiving necessity determination of the pattern printing process through the input section. When it is designated in the necessity determination receiving process that the pattern printing process is unnecessary, the controller performs the notification displaying process without performing the pattern printing process.

According to aspects of the present disclosures, there is provided a method of controlling an image processing apparatus having an input section, a display, a storage, a printer configured to print an image on a recording medium and a scanner configure to scan an image. The method includes a normal printing step of driving the printer based on driving information to print an image on the recording medium in accordance with print data, when a correction request of the driving information is input through the input section, a pattern printing step of printing correction pattern representing an image corresponding to the input correction request on the recording medium by driving the printer based on the driving information, after the correction pattern is printed in the pattern printing step, a notification displaying step of displaying a scan notification screen prompting to scan the printed correction pattern using the scanner, when the scan notification screen is being displayed on the display, a scanning request receiving step of receiving a scanning request of the printed correction pattern through the input section, when the scanning request is received in the scanning request receiving step, an image scanning step of scanning an image with the scanner, a correcting step of correcting the driving information based on a scanned image which is an image scanned in the image scanning step, when a particular standby condition is satisfied without the scanning request being received in the scanning request receiving step after the scan notification screen is displayed in the notification displaying step, an information setting step of setting non-completion information corresponding to the input correction request in the storage, when a particular standby release condition is satisfied without the scanning request is received in the scanning request receiving step after the scan notification screen is displayed in the notification displaying step, a screen switching step of displaying, on the display, a screen corresponding to the satisfied standby release condition instead of the scan notification screen at a particular timing after the standby release condition is satisfied, and when the correction request is input through the input section in a non-complete state in which the non-completion information is set in the storage and a screen different from the scan notification screen is being displayed on the display, a necessity determination receiving step of receiving necessity determination of the pattern printing step through the input section. When it is designated in the necessity determination receiving step that the pattern printing step is unnecessary, the controller performs the notification displaying step without performing the pattern printing step.

According to aspects of the present disclosures, there is provided a non-transitory computer-readable recording medium for an image processing apparatus having an input section, a display, a storage, a printer configured to print an image on a recording medium, a scanner configure to scan an image and a controller. The recoding medium stores instructions which cause, when executed by the controller, the image processing apparatus to perform a normal printing process of driving the printer based on driving information to print an image on the recording medium in accordance with print data, when a correction request of the driving information is input through the input section, a pattern printing process of printing correction pattern representing an image corresponding to the input correction request on the recording medium by driving the printer based on the driving information, after the correction pattern is printed in the pattern printing process, a notification displaying process of displaying a scan notification screen prompting to scan the printed correction pattern using the scanner, when the scan notification screen is being displayed on the display, a scanning request receiving process of receiving a scanning request of the printed correction pattern through the input section, when the scanning request is received in the scanning request receiving process, an image scanning process of scanning an image with the scanner, a correcting process of correcting the driving information based on a scanned image which is an image scanned in the image scanning process, when a particular standby condition is satisfied without the scanning request being received in the scanning request receiving process after the scan notification screen is displayed in the notification displaying process, an information setting process of setting non-completion information corresponding to the input correction request in the storage, when a particular standby release condition is satisfied without the scanning request is received in the scanning request receiving process after the scan notification screen is displayed in the notification displaying process, a screen switching process of displaying, on the display, a screen corresponding to the satisfied standby release condition instead of the scan notification screen at a particular timing after the standby release condition is satisfied, and when the correction request is input through the input section in a non-complete state in which the non-completion information is set in the storage and a screen different from the scan notification screen is being displayed on the display, a necessity determination receiving process of receiving necessity determination of the pattern printing process through the input section. When it is designated in the necessity determination receiving process that the pattern printing process is unnecessary, the controller performs the notification displaying process without performing the pattern printing process.

BRIEF DESCRIPTION OF THE ACCOMPANYING DRAWINGS

FIGS. 3A, 3B, 4, 5A and 5B show transition of screens when a correction function is executed.

FIGS. 6A and 6B show transition of screens (partial) when a printed pattern effectiveness flag is set to ON.

DETAILED DESCRIPTION OF THE EMBODIMENT

Hereinafter, illustrative embodiments according to the present disclosures will be described, referring to the accompanying drawings.

1. Embodiment (1) Configuration of Image Processing Apparatus

An image processing apparatus 10 (see FIG. 1), which is an embodiment of the present disclosures, has a plurality of functions including a printing function, a scanning function, a copying function and a facsimile function. The printing function is a function of printing images on recording sheets 35. The scanning function is a function of reading images on originals and generates image data of the read images. The copying function is a function of printing images, which are read with the scanning function, on the recording sheets 35 with the printing function. The facsimile function is a function of transmitting/receiving facsimile data.

Figure 1:
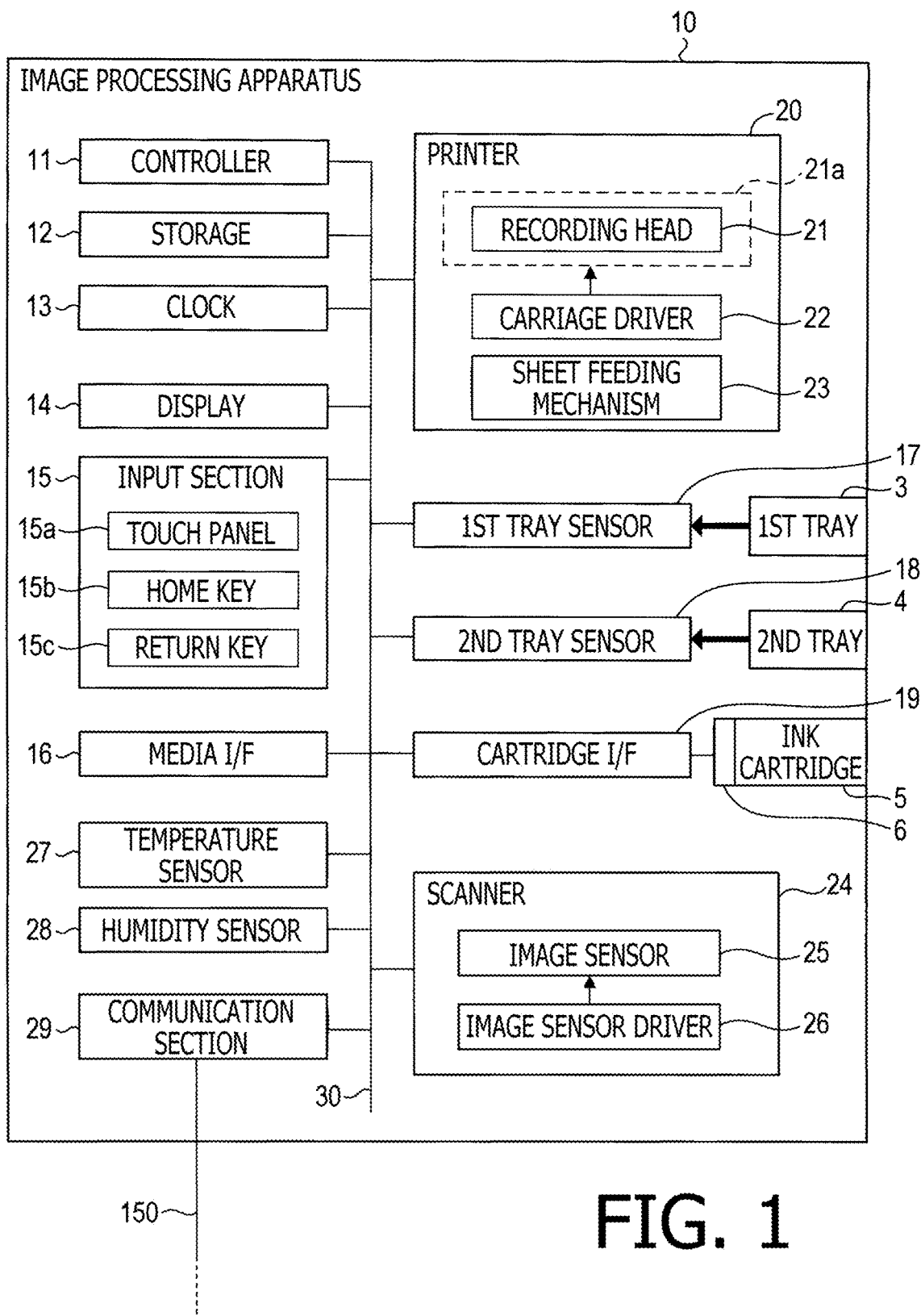
FIG. 1 is a block diagram illustrating a configuration of an image processing apparatus according to an illustrative embodiment of the present disclosures.

As shown in FIG. 1, the image processing apparatus 10 includes a controller 11, a storage 12, a clock 13, a display 14, an input section 15, a media I/F 16, a first tray sensor 17, a second tray sensor 18, a cartridge I/F 19, a printer 20, a scanner 24, a temperature sensor 27, a humidity sensor 28 and a communication section 29, which are interconnected through a bus 30.

The image processing apparatus 10 further includes a first tray 3, a second tray 4 and an ink cartridge 5. The first tray, 3, the second tray 4 and the ink cartridge 5 are respectively configured to detachably attached to a casing of the image processing apparatus 10.

Each of the first tray 3 and the second tray 4 is configured to accommodate the recording sheets 35. According to the illustrative embodiment, each of the first tray 3 and the second tray 4 is configured to accommodate any of one or more sizes and types of recording sheets 35. For example, the first tray 3 may configured to accommodate at least one of the A4 size, A3 size, B5 size, US letter size, L-size (89 mm×127 mm), 2L-size (178 mm×127 mm), a postcard size and envelope size. The second tray 4 is configured similarly.

The types of the recording sheets 35 accommodatable in the first tray 3 may include, for example, at least one of a plurality of types of sheets such as normal sheets, inkjet sheets and glossy sheets. So are the recording sheets 35 accommodatable in the second tray 4.

It is noted that the first tray 3 and the second tray 4 may be configured to accommodate the recording sheets 35 of which the size(s) and/or type(s) are different. The first tray sensor 17 is configured to detect whether the first tray 3 is attached to the image processing apparatus 10. For example, the first tray sensor 17 may be configured to output a first tray attachment signal to the bus 30 when the first tray 3 is attached to the image processing apparatus 10.

The second tray sensor 18 is configured to detect whether the second tray 4 is attached to the image processing apparatus 10. For example, the second tray sensor 18 may be configured to output a second tray attachment signal to the bus 30 when the second tray 4 is attached to the image processing apparatus 10.

The controller 11 is configured to obtain the first tray attachment signal and the second tray attachment signal through the bus 30. The ink cartridge 5 accommodates ink which is to be ejected towards the recording sheet 35 to print images on the recording sheets 35. The ink cartridge 5 accommodates, for example, black ink.

An IC chip 6 is provided to the ink cartridge 5 integrally therewith. The IC chip 6 stores various pieces of cartridge information regarding the ink cartridge 5 to which the IC chip 6 is provided. The cartridge information includes, for example, product data, used ink amount data and ink sedimentation data. The product data includes information indicating whether the ink cartridge 5 is a genuine product or not.

A cartridge I/F 19 is configured to detect whether the ink cartridge 5 is attached to the image processing apparatus 10. For example, the cartridge I/F 19 is configured to output a cartridge attachment signal to the bus 30 when the ink cartridge 5 is attached to the image processing apparatus 10. The cartridge I/F 19 is further configured to retrieve the cartridge information of the IC chip 6 of the ink cartridge 5 attached to the image processing apparatus 10 and output the same to the bus 30. The controller 11 is configured to obtain, through the bus 30, the cartridge attachment signal and the cartridge information.

It is noted that the image processing apparatus 10 may be configured such that a plurality of ink cartridges 5 accommodating different colors may be attached thereto. In such a case, the image processing apparatus 10 may be provided with a plurality of cartridge I/F's for detecting respective ink cartridges 5, respectively and independently.

The controller 11 has a CPU. The storage 12 has semiconductor memories, for example, a ROM, a RAM, a NVRAM and a flash memory. That is, the image processing apparatus 10 is provided with a microcomputer having the CPU and the semiconductor memories.

The controller 11 is configured to realize respective functions by executing programs which are stored in a non-transitory recording medium. According to the illustrative embodiment, the storage 12 is an example of the non-transitory recording medium which stores the programs. It is noted that all the functions realized by the controller 11 need not be realized by execution of the programs. A part of or all of the functions may be realized with use of one or more pieces of hardware.

The clock 13 is configured to output time information representing a current time. The time information may be information in seconds, in minutes or in hours. Alternatively, the time information may include information indicating at least one of year, month and day. The clock 13 is provide with, for example, a battery and may be configured to operate using electrical power supplied by the battery, even if no electrical power is supplied to the image processing apparatus 10. The clock 13 may include, for example, a so-called real time clock.

The display 14 has a displaying device (e.g., an LCD or an organic EL display) configured to display images. The input section 15 has an inputting device through which inputting operations by a user are received. An example of the inputting device provided to the input section 15 is a touch panel 15a. The touch panel 15a is arranged on an image displaying area, where images are displayed, of the displaying device of the display 14.

The input section 15 includes a home key 15b, a return key 15c and not-shown other keys (e.g., a power key, numeral keys, an interruption key and the like). Such keys are provided on a side surface of the casing of the image processing apparatus 10 so as to be easily operated (e.g., depressed) by the user. The controller 11 displays a standby screen on the display 14 when the home key 15b is depressed. Further, when the return key 15c is depressed, the controller 11 displays a screen which was displayed immediately before the currently displayed screen on the display 14.

The touch panel 15a is configured to detect instructive operations, by a user, of bringing an indicator close to or in contact with the image displaying area of the display 14. That is, the touch panel 15a is configured such that, when the instructive operation is performed with respect to the image displaying area of the display 14, the touch panel 15a outputs position information indicating a designated position to which the instructive operation is performed. It is noted that the touch panel 15a according to the illustrative embodiment is configured to output the position information continuously or periodically when the instructive operation with use of the indicator is being operated continuously.

It is noted that the touch panel 15a may be configured to detect only contact of the indicator as the instructive operation, only when the indicator is brought close to the display 14 or the both.

The controller 11 is configured to obtain the position information output by the touch panel 15a and, based on the obtained position information, whether the instructive operation using the indicator has been performed, the designated position when the instructive operation has been performed, and at least one kind of particular operations using the indicator when the instructive operation has been made.

As the particular operations detectable by the controller 11 include at least a tapping operation. The tapping operation is an operation of performing the instructive operation using the indicator at a certain position with respect to the display 14 and moving the indicator away from the display at the same position, repeatedly. There could be various types of indicators with which the above-described instructive operation can be performed. For example, the indicator could be a tip of a finger or a particular instructive device such as a stylus pen.

The media I/F 16 is an interface to which various types of storing medium (e.g., a USB flash memory) is detachably attached and is configured to control writing/reading of data with respect to the attached storing medium.

The printer 20 has a printing mechanism in accordance with an inkjet printing technique and is configured to print images on the sheet-type recording sheets 35. The printer 20 has a carriage 21*a*, a recording head 21, a carriage driver 22 and a sheet feeding mechanism 23.

The sheet feeding mechanism 23 is configured to pick up one recording sheet 35 from the first tray 3 or the second tray 4 and feed the same along a feeding passage. For this purpose, the sheet feeding mechanism 23 is provided with a sheet feed roller, a sheet feeding roller which feeds the recording sheet 35 picked up by the sheet feed roller along the sheet feeding passage. The sheet feeding mechanism 23 is further provided with a sheet discharge roller which feeds the recording sheet 35 on which images have been recorded to a discharge tray and at least one motor which drives the sheet feed roller, the sheet feeding roller and the sheet discharge roller. Since such a configuration is well known in the field of printers, detailed descriptions thereof referring to drawings will be omitted for brevity.

Figure 2:
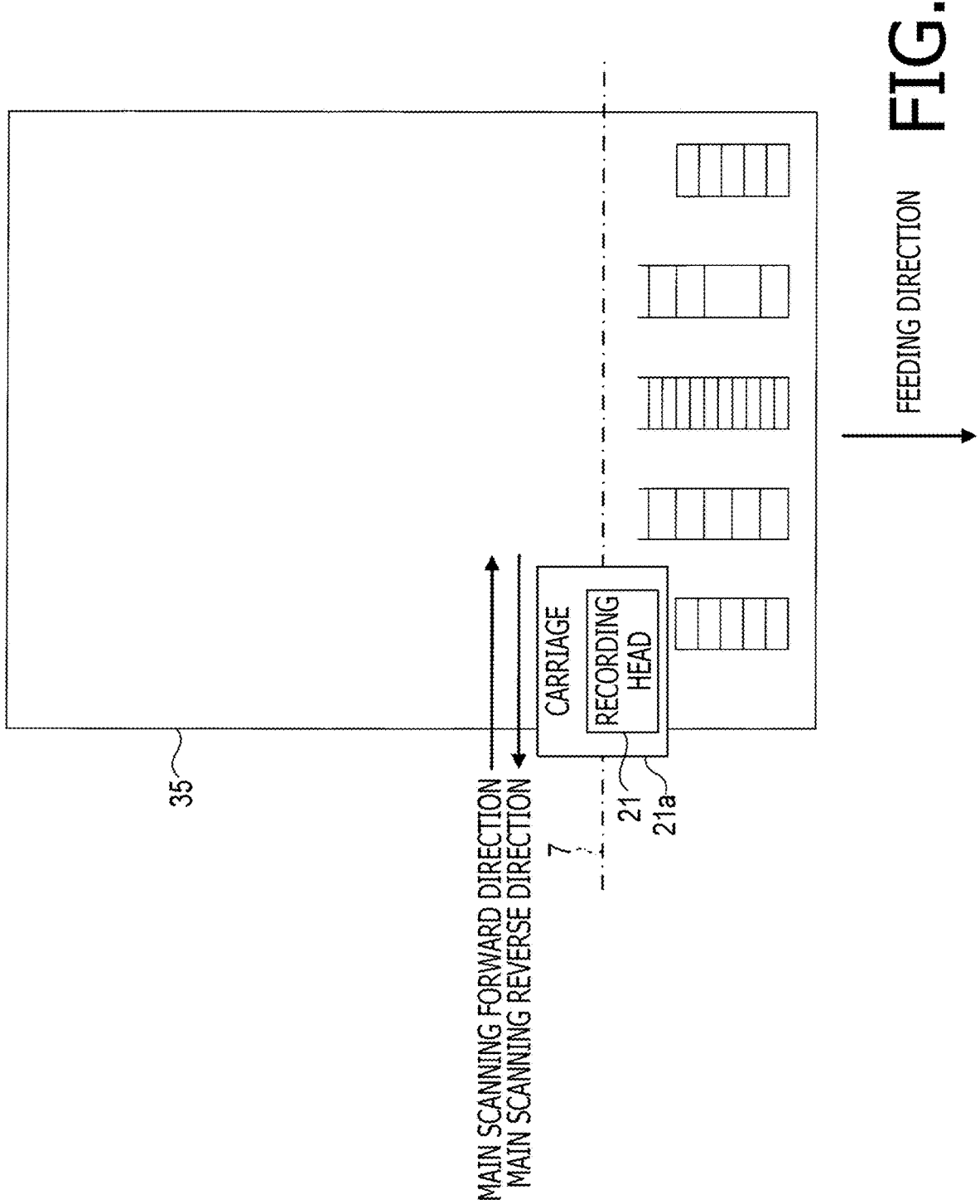
FIG. 2 illustrates a feeding direction of a recording sheet and moving directions of a carriage.

The recording head 21 is integrally provided to the carriage 21*a*. The carriage 21*a* is driven to move by the carriage driver 22. As schematically shown in FIG. 2, the carriage 21*a* is driven to move bidirectionally along a main scanning line 7. The main scanning line 7 extends in a direction perpendicular to the feeding direction in which the recording sheet 35 is fed.

When the carriage 21*a* is driven to move, the recording head 21 integrally provided to the carriage 21*a* also moves. According to the present embodiment, to move the carriage 21*a* and to move the recording head 21 are the same operations.

The recording head 21 is configured to eject the ink accommodated in the ink cartridge 5. The ink cartridge 5 may be mounted on the carriage 21*a* and is moved together with the carriage 21*a* and the recording head 21, or the ink cartridge 5 may be arranged separately from the carriage 21*a*.

The controller 11 realizes the printing function by controlling the printer 20. When the printing function is executed, the controller 11 drives the sheet feeding mechanism 23 to pick up the recording sheet 35 form one of the trays 3 and 4 and feed the same by a particular sheet feeding pitch (e.g., 1.5 inches) in the sheet feeding direction. It is noted that the tray from which the recording sheet 35 is fed may be designated by the user or automatically selected by the controller 11.

The controller 11 makes the sheet feeding mechanism 23 feed the recording sheet 35 on an above-described pitch basis, and makes the recording head 21 move in one direction or bidirectionally move in both directions along the main scanning line 7 every time when the recording sheet 35 is fed by one pitch amount. Further, the controller 11 makes the recording head 21 eject the ink in accordance with print data representing the image to be printed during the movement of the recording head 21, thereby the image represented by the print data being printed on the recording sheet 35.

The recording head 21 is configured such that a movement of the recording head 21 in a main scanning forward direction (i.e., a direction from a particular starting point in a forward direction to a particular starting point in a reverse direction in the main scanning reverse direction), and the movement of the recording head 21 in the main scanning reverse direction (i.e., a direction from the particular starting point in the reverse direction to the particular starting point in the forward direction in the main scanning reverse direction) are repeated alternately. That is, every time when the recording sheet 35 is fed by the particular feeding pitch, the controller 11 alternately moves the recording head 21 in the main scanning forward direction in the main scanning reverse direction. In the following description, the main scanning forward direction and the main scanning reverse direction will also be simply referred to as a forward direction and a reverse direction, respectively.

When the recording head 21 is moving in the main scanning forward direction and when the recording head 21 is moving in the main scanning reverse direction, the controller control s the recording head 21 to eject the ink at every particular ejection timing, thereby an image being printed on the recording sheet 35.

When the controller 11 executes the printing function, the controller 11 drives the printer 20 based on driving information set to at the time of execution. It is noted that the driving information set to the printer 20 is stored in the storage 12. The driving information includes feeding distance information for driving the sheet feeding mechanism 23 and ejection driving information for driving the recording head 21. The feed driving information includes, for example, information regarding a feeding pitch in the feeding direction and the feeding speed of the recording sheet. The feed driving information may be varied depending on the size and/or type of the recording sheet 35 to be fed.

The ejection driving information includes, for example, information indicating moving speeds of the recording head 21 in the forward direction and the reverse direction, respectively, and information indicating ejection timings of the ink when the recording head 21 moves in the forward direction and the reverse direction, respectively. It is noted that the ejection driving information may vary depending on the size and/or type of the recording sheet 35 to be fed.

When the printing function is executed, the controller 11 controls the sheet feeding mechanism 23 to feed the recording sheet 35 on a basis of the feeding pitch which is set as the driving information. Further, at every feeding of the recording sheet 35 by the feeding pitch, the controller 11 makes the recording head 21 reciprocate with making the recording head 21 eject the ink in accordance with the ejection timing set in the driving information.

It is noted that default driving information may be set at a particular timing (e.g., at a timing of manufacturing or shipping of the image processing apparatus 10). Then, the driving information may be corrected when the print quality correcting function is executed in accordance with the user's instruction.

The controller 11 is configured to store the number of the recording sheets 35 on which images have been printed in an accumulated manner in the storage 12 every time when images are printed on one recording sheet 35 by the printer 20. That is, every time when the images are printed on one recording sheet 35, an accumulated number of sheets, which is stored in the storage 12, is incremented by one.

It is noted that the printer 20 may be configured such that images are printed on both surfaces of the recording sheet 35. In other words, the printer 20 may be configured to perform either a one-side printing or a both-side printing.

The scanner 24 has an image sensor 25 and an image sensor driver 26. The image sensor driver 26 drives the image sensor 26 to scan an image subject to be scanned (i.e., an image formed on an original). The image sensor 25 scans the image on the original which is placed on an original table provided to the image processing apparatus 10 and generates image data (hereinafter, referred to as scan data) representing the scanned image.

When the scanning function is executed, the controller 11 controls the scanner 24 so that an image on the original is read by the image sensor 25, thereby the scan data of the original being obtained.

The temperature sensor 27 is arranged at a particular temperature detecting position and configured to output temperature detection data indicating the temperature of the particular temperature detecting position to the bus 30. It is noted that the particular temperature detecting position could be any position inside the image processing apparatus 10. For example, the temperature sensor 27 may be arranged on or adjacent to the recording head 21 in order to detect the temperature of the recording head 21 or are in the vicinity of the recording head 21. For another example, the temperature sensor 27 may be arranged on a side surface of the casing of the image processing apparatus 10 in order to detect ambience temperature around the image processing apparatus 10.

The humidity sensor 28 is arranged at a particular humidity detecting position of the image processing apparatus 10, and output humidity detection data indicating humidity at the humidity detecting position to the bus 30. It is noted that the humidity detecting position may be any position of the image processing apparatus 10. For example, the humidity sensor 28 may be arranged on or adjacent to the recording head 21 in order to detect the humidity at a position around the recording head 21. For another example, the humidity sensor 28 may be provided on the side surface of the casing of the image processing apparatus 10 in order to detect ambient humidity of the image processing apparatus 10.

The communication section 29 is a communication interface configured to connect the image processing apparatus 10 to a communication network 150. The communication network 150 may include at least one of networks such as a wired LAN, a wireless LAN, the Internet and a public telephone network. The image processing apparatus 10 may be configured to perform wired or wireless data communication with various types of information processing devices (e.g., a PC, a smartphone, a tablet terminal, and etc.) through the communication section 29. Alternately or optionally, the image processing apparatus 10 may be configured to be connected to the Internet through the communication section 29 and perform data communication with various servers or other information processing apparatuses through Internet. Further optionally or alternatively, the image processing apparatus 10 may be configured to transmit/receive facsimile data through the communication section 29.

It is noted that various pieces of data corresponding to screens shown in FIGS. 3A-6B are stored in the non-volatile memory (e.g., an NVRAM, a flash memory and the like), which is configured to retain stored data even if electrical power is not being supplied. Further, programs which cause the controller 10 to perform a main process illustrated in a flowchart shown in FIGS. 8A-10B to realize the aforementioned functions are also stored in the non-volatile memory. In addition to the above, the non-volatile memory stores the driving information mentioned above, data of various correction patterns, pattern print history information, tray attaching/detaching information, cartridge attaching/detaching information, cartridge genuineness information, used ink amount information, the ink sedimentation information and the printed pattern effectiveness flag.

The tray attaching/detaching information includes times at which the first tray 3 and the second tray 4 are attached/detached, respectively. The controller 11 refers to the time information from the clock 13 at particular storage timings during a period where the first tray 3 or the second tray 4 is detached and is attached again every time when the first tray 3 or the second tray 4 is detached and attached, and stores the tray attaching/detaching information based on the time information. It is noted that the tray attaching/detaching information is stored for ones of the first tray 3 and the second tray 4, respectively and independently.

The cartridge attaching/detaching information includes, when the ink cartridge 5 is attached/detached, the times when the ink cartridge 5 is attached/detached. The controller 11 refers to the time information from the clock 13 at particular storage timings during a period where the ink cartridge 5 is detached and is attached again every time when the ink cartridge 5 is detached and attached, and stores the cartridge attaching/detaching information based on the time information.

The cartridge genuineness information indicates whether the attached ink cartridge 5 is a genuine cartridge or a non-genuine cartridge. The controller 11 obtains the cartridge information from the IC chip 6, for example, every time when the ink cartridge 5 is attached to the image processing apparatus 10 and stores the cartridge genuineness information based on the information contained in the cartridge information.

The used ink amount information indicates an accumulated used amount of the ink which has been used to print images on the recording sheet 35. For example, every time when the printing function is executed, the controller 11 may obtain the cartridge information of the IC chip 6 after the printing function has been executed and store the used ink amount based on the used ink amount data contained in the cartridge information. Alternatively, the controller 11 may not use the cartridge information stored in the IC chip 6 but calculate the used ink amount at every execution of the printing function.

The ink sedimentation information indicates a sedimentation level of the ink in the ink cartridge 5. For example, the controller 11 may obtain the cartridge information from the IC chip 6 at a particular information obtaining timing and store the ink sedimentation information based on the ink sedimentation data contained in the cartridge information. Alternatively, the controller 11 may not use the cartridge information stored in the IC chip 6 but calculate the ink sedimentation periodically or at every particular updating timing and store the calculated ink sedimentation.

The printed pattern effectiveness flag is set to ON or OFF by the controller 11, and information indicating the ON or OFF state of the printed pattern effectiveness flag is stored. Further, the printed pattern effectiveness flags are set for types of correcting function, respectively and independently (described later).

(2) General Description of Print Quality Correcting Function

The aforementioned print quality correction function is a function aimed to improve a print quality of the image which is printed by the printer 20 onto the recording sheet 35. Specifically, the print quality correcting function includes a ruled line deviation correcting function and a feeding distance correcting function. Therefore, according to the present embodiment, the printed pattern effectiveness flags are set to the ruled line deviation correcting function and the feeding distance correcting function, respectively and independently.

The ruled line deviation correcting function is a function of ameliorating a ruled line deviation which is a kind of deterioration of the print quality. The ruled line deviation is a phenomenon that there exists misalignment in an image in a direction parallel with the main scanning line 7. That is, when the ruled line deviation occurs, two image portions which are continuous but arranged on opposite sides with respect to a line parallel with the main scanning line 7 are misaligned. One of causes of the ruled line deviation, there is a mismatch between the ejection timings when the recording head 21 is moved in the forward direction and in the reverse direction.

If the ejection timings when the recording head 21 moves in the forward direction and in the reverse direction match, the ink landing positions, in a direction parallel to the main scanning line 7, of ink droplets ejected from the recording head 21 at respective ejection timings when the recording head 21 moves in the forward direction and those when the recording head 21 moves in the reverse direction match.

In contrast, if the ejection timings when the recording head 21 moves in the forward direction and in the reverse direction do not match, the ink landing positions, in a direction parallel to the main scanning line 7, of ink droplets ejected from the recording head 21 at respective ejection timings when the recording head 21 moves in the forward direction do not match those when the recording head 21 moves in the reverse direction match. Due to the above, the ruled line deviation occurs.

The ejection driving information set to the image processing apparatus 10 is initially adjusted to a value such that the ruled line deviation does not occur at a particular timing before the image processing apparatus 10 is shipped, and the adjusted value is set to the image processing apparatus 10 as the initial value. Although the initial value of the ejection driving information is set as described above, due to various causes such as the type of the recording sheet 35 and a change of a distance between the recording head 21 and the recording sheet 35, even if the printing function is executed based on the initially set ejection driving information, the ruled line deviation may occur.

Figure 7:
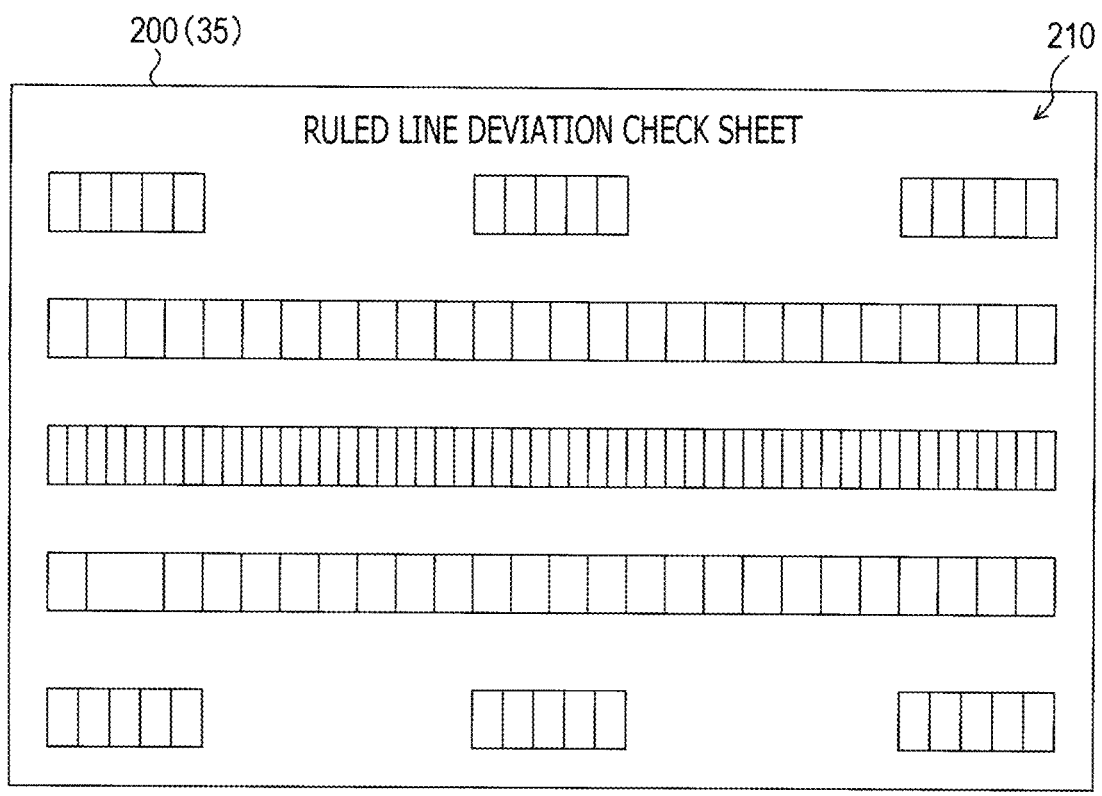
FIG. 7 shows an example of a correction check sheet on which a correction pattern is printed.

When the ruled line deviation correcting function is executed, the currently set ejection driving information is corrected so that occurrence of the ruled line deviation is suppressed. Specifically, when the ruled line deviation correcting function is executed, a ruled line deviation correction pattern 210 as shown in FIG. 7 is printed on the recording sheet 35. Thereafter, a screen prompting the user to place a ruled line deviation check sheet 200 (i.e., the recoding sheet 35 on which the ruled line deviation correction pattern 210 has been printed) on the original table and start executing the scanning function. Then, when the user makes the image processing apparatus 10 perform scanning of the ruled line deviation check sheet 200, the controller 11 executes a correcting process based on the scan data of the ruled line deviation correction pattern 210 output by the scanner 24.

For example, the controller 11 detects a deviating amount of the image along the line parallel with the main scanning line 7, calculates a correction value of the ejection driving information (hereinafter, referred to as an ejection correction value) with which the deviation of the images in the direction parallel with the main scanning line 7 does not occur based on the detected ruled line deviation amount, and stores the calculated ejection correction value in the storage 12. It is noted that the ejection correction value is a correction value corresponding to the ink ejection timing.

When the ejection correction value is stored during the correcting process as described above, the controller 11 executes the printing function based on the ejection driving information to which the initial setting has been applied and the ejection correction value. That is, when the printing function is executed, the controller 11 retrieves the initially set ejection driving information and the ejection correction value, and correct the ejection driving information with the ejection correction value. Thereafter, the controller 11 executes the printing function by controlling the printer 20 based on the corrected ejection driving information.

Alternatively, the controller 11 may be configured to correct for the currently set ejection driving information with the calculated ejection correction value and update the currently set ejection driving information with the new (i.e., corrected) ejection driving information. In such a case, the controller 11 executes the printing function by retrieving the currently set ejection driving information and controlling the printer 20 based on the retrieved ejection driving information.

When the ruled line deviation correcting function is executed, the user designates the size and type of the recording sheet 35 on which the ruled line deviation correction pattern 210 is to be printed. It is noted that the ruled line deviation correction patterns 210 are provided for the sizes and types of the recording sheets 35, respectively and independently. That is, for different sizes of the recording sheets 35, different ruled line deviation correction patterns 210 are used, respectively, and for different types of the recording sheets 35, different ruled line deviation correction patterns 210 are used, respectively.

Then, the controller 11 controls the printer 20 to print the ruled line deviation correction pattern corresponding to the size and type of the recording sheet 35 designated by the user onto the recording sheet 35 of the size and type designated by the user.

The feeding distance correcting function is a function of ameliorating feeding distance which is one of the causes of deterioration of the print quality. The feeding distance is a phenomenon that lines extending in the direction parallel with the main scanning line 7 are periodically arranged in the feeding direction in the printed image (i.e., lines forming a stripe are included in the image). One of the reasons that cause the feeding distance is mismatch of a feeding pitch between one indicated by the feed driving information (hereinafter, referred to as a reference feeding pitch) and an actual feeding pitch.

When, for example, the actual feeding pitch of the recording sheet 35 is shorter than the reference feeding pitch, there could be a case where a part of an image printed at a certain feeding position of the recording sheet 35 and another part of the image printed at a next feeding position (i.e., after the recording sheet 35 is fed by the feeding pitch) overlap each other and a dark (close to black) stripe-like line may appear on the image. For another example, when the actual feeding pitch of the recording sheet 35 is longer than the reference feeding pitch, a stripe-like line portion where no ink is applied may be formed between a part of an image printed at a certain feeding position of the recording sheet 35 and another part of the image printed at a next feeding position (i.e., after the recording sheet 35 is fed by the feeding pitch).

The feed driving information set to the image processing apparatus 10 is initially adjusted to a value such that the feeding distance does not occur at a particular timing before the image processing apparatus 10 is shipped, and the adjusted value is set to the image processing apparatus 10 as the initial value. Although the initial value of the feed driving information is set as described above, due to various causes such as the type of the recording sheet 35 and a change of a distance between the recording head 21 and the recording sheet 35, even if the printing function is executed based on the initially set feed driving information, the feeding distance may occur.

When the feeding distance correcting function is executed, the currently set feed driving information is corrected so that occurrence of the feeding distance is suppressed. Specifically, when the feeding distance correcting function is executed, a feeding distance correction pattern (not shown) is printed on the recording sheet 35. Thereafter, a screen prompting the user to place a feeding distance check sheet (i.e., the recoding sheet 35 on which the feeding distance correction pattern has been printed) on the original table and start executing the scanning function is displayed. Then, when the user makes the image processing apparatus 10 perform scanning of the feeding distance check sheet, the controller 11 executes a correcting process based on the scan data of the feeding distance correction pattern output by the scanner 24.

For example, the controller 11 detects the color and width of the stripe line in the feeding direction, and calculates a correction value of the feed driving information (hereinafter, referred to as a feeding correction value) with which the strip-like lines will not be formed based on the detected color and width, and stores the calculated feeding correction value in the storage 12. It is noted that the feeding correction value is a correction value corresponding to the feeding pitch.

When the feeding correction value is stored during the correcting process as described above, the controller 11 executes the printing function based on the feed driving information to which the initial setting has been applied and the feeding correction value. That is, when the printing function is executed, the controller 11 retrieves the initially set feed driving information and the feeding correction value, and corrects the feed driving information with the feeding correction value. Thereafter, the controller 11 executes the printing function by controlling the printer 20 based on the corrected feed driving information.

Alternatively, the controller 11 may be configured to correct the currently set feed driving information with the calculated feeding correction value and update the currently set feed driving information with the new (i.e., corrected) feed driving information. In such a case, the controller 11 executes the printing function by retrieving the currently set feed driving information and controlling the printer 20 based on the retrieved feed driving information.

When the feeding distance correcting function is executed, the user designates the size and type of the recording sheet 35 on which the feeding distance correction pattern is to be printed. It is noted that the feeding distance correction patterns are provided for the sizes and types of the recording sheets 35, respectively and independently. That is, for different sizes of the recording sheets 35, different feeding distance correction patterns are used, respectively, and for different types of the recording sheets 35, different feeding distance correction patterns are used, respectively.

Then, the controller 11 controls the printer 20 to print the feeding distance correction pattern corresponding to the size and type of the recording sheet 35 designated by the user onto the recording sheet 35 of the size and type designated by the user.

When one of the correction patterns is printed as the controller 11 executes the print quality correcting function, the controller 11 stores pattern print history information corresponding to the printed correction pattern in the storage 12. It is noted that the pattern print history information includes, for example, correction pattern identification information, sheet size information, sheet type information, correction target information, used tray information, print time information, temperature-in-printing information, and humidity-in-printing information.

The correction pattern identification information is information uniquely identifying a printed pattern. It is noted that multiple different correction patterns are associated with multiple different pieces of correction identification information, respectively. The sheet size information indicates the size of the recording sheet 35 on which the correction pattern is printed. The sheet type information indicates the type of the recording sheet 35 on which the correction pattern is printed. The correction target information is information indicating whether the printed correction pattern is the ruled line deviation correction pattern or the feeding distance correction pattern. In other words, the correction target information indicates a correction function to be executed using the recording sheet 35 on which the correction pattern is printed. The used tray information indicates the tray in which the recording sheet 35 on which the correction pattern is printed was accommodated. The print time information indicates the time when the correction pattern is printed. For example, the print time information indicates time information obtained from the clock 13 at a particular information obtaining timing during a particular print executing period including an actual printing period in which the correction pattern is being printed on the recording sheet 35. The temperature-in-printing information indicates the temperature when the correction pattern is being printed. For example, the temperature-in-printing indicates the temperature represented by the temperature detection data output by the temperature sensor 27 at the aforementioned information obtaining timing. The humidity-in-printing information indicates the humidity when the correction pattern is being printed. For example, the humidity-in-printing indicates the humidity represented by the humidity detection data output by the humidity sensor 28 at the aforementioned information obtaining timing.

(3) Transition of Screens when Print Quality Correcting Function is Executed

Figure 3A:
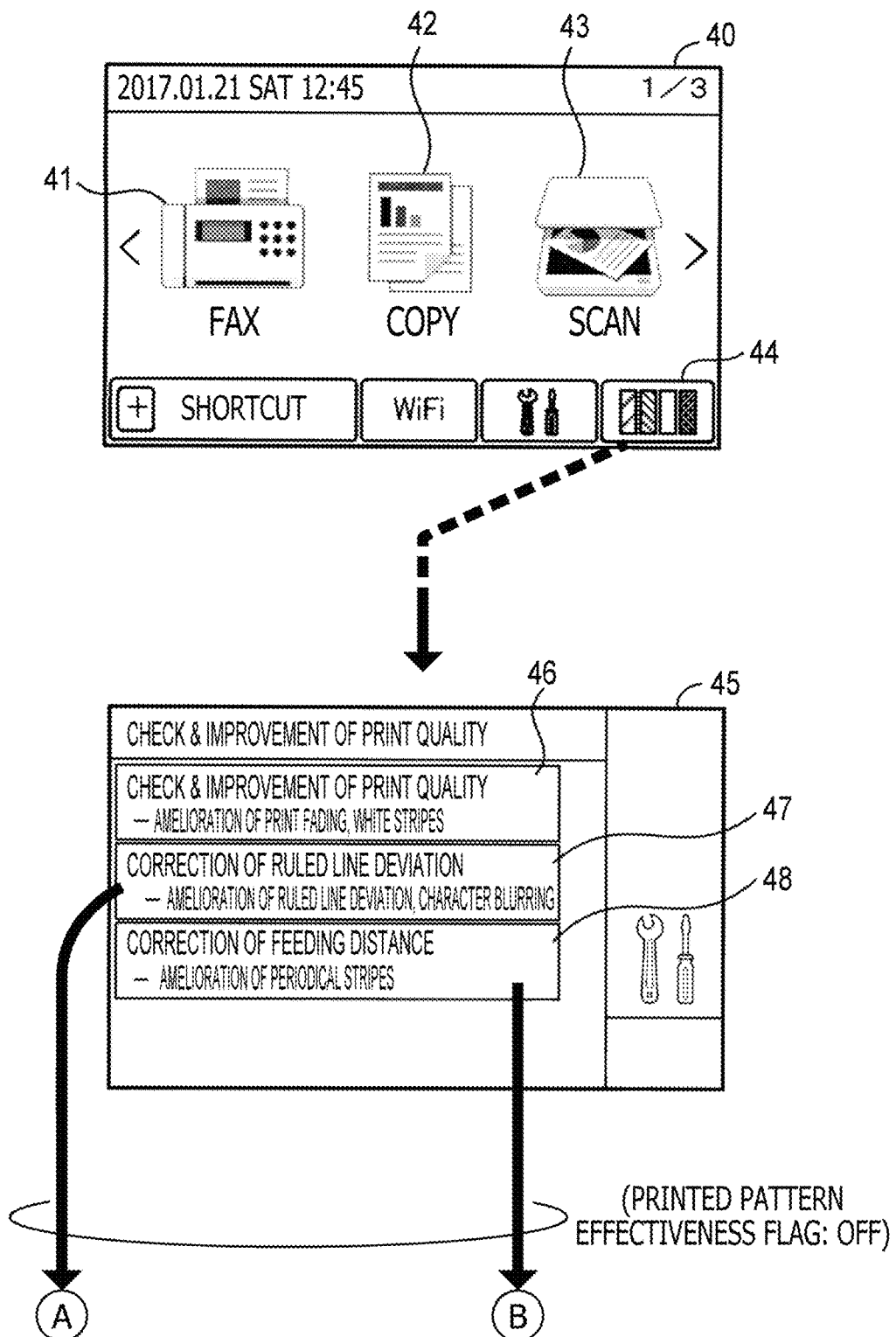

The controller 11 starts operating when a power switch of the image processing apparatus 10 is operated and the electrical power is supplied to the controller 11. When started, the controller 11 executes an initial process and displays a standby screen 40 as shown in FIG. 3A on the display 14. The standby screen 40 is a screen serves as a starting point when the user makes the image processing apparatus 10 execute respective functions.

On the standby screen 40, a plurality of function buttons for executing respective functions are displayed. On the standby screen 40 shown in FIG. 3A, as the function buttons, a fax button 41, a copy button 42 and a scan button 43 are shown. When the user taps the fax button 41, the controller 11 executes the facsimile function. When the user taps the copy button 42, the controller 11 executes the copying function. When the user taps the scan button 43, the controller 11 executes the scanning function.

On the standby screen 40, an ink menu button 44 is also displayed. When the user taps the ink menu button 44, the controller 11 displays a maintenance menu screen (not shown) on the display. On the maintenance menu screen, a plurality of buttons respectively corresponding to a plurality of kinds of maintenance processes for the image processing apparatus 10 are displayed. It is noted that a print quality maintenance button is included in the plurality of buttons displayed on the maintenance menu screen. When the print quality maintenance button is tapped, the controller 11 displays a print quality menu screen 45 (see FIG. 3A) on the display 14.

On the print quality menu screen 45, a plurality of buttons corresponding to various menus for checking or ameliorating quality of image which is to be printed on the recording sheet 35 by the printer 20 are displayed. According to the present embodiment, on the print quality menu screen 45, a check button 46, a ruled line deviation correction button 47 and a feeding distance correction button 48 are displayed on the print quality menu screen 45 as shown in FIG. 3A.

When the check button 46 is tapped, the controller 11 drives the printer 20 to print a particular quality check image on the recording sheet 35. Then, the user recognizes the print quality by viewing the quality check image as printed. If, for example, deterioration of the print quality is recognized (e.g., the quality check image is partially thinned, the quality check image includes unprinted portion, or the like), the user can improve the print quality by causing the printer 20 to execute a cleaning process of the recording head 21.

When a ruled line deviation correction button 47 is tapped, the controller 11 starts executing the ruled line deviation correcting function described above. In this case, when the printed pattern effectiveness flag, which corresponds to the ruled line deviation correcting function, is set to OFF, the controller 11 displays a ruled line deviation correction guidance screen 50 (see FIG. 3B) on the display 14. The ruled line deviation correction guidance screen 50 contains a message indicating that the ruled line deviation correction function is started, and a "NEXT" button 51. When the "NEXT" button 51 is tapped, the controller 11 displays a quality confirmation screen 60 on the display 14.

When a feeding distance correction button 48 displayed in the print quality menu screen 45 is tapped, the controller starts executing the feeding distance correcting function described above. In this case, when the printed pattern effectiveness flag, which corresponds to the feeding distance correcting function, is set to OFF, the controller 11 displays a feeding distance correction guidance screen 55 (see FIG. 3B) on the display 14. The feeding distance correction guidance screen 55 contains a message indicating that the feeding distance correcting function is started, and a "NEXT" button 56. When the "NEXT" button 51 is tapped, the controller 11 displays the quality confirmation screen 60 on the display 14.

Hereinafter, a transition of displayed screens as the print quality correcting function is executed will be described. In is noted that, in the following description, the transition of screens when an execution target of the print quality correcting function (hereinafter, referred to as a target correcting function) is the ruled line deviation correcting function will be described, while the transition of screens when the target correcting function is the feeding distance correcting function will described only briefly for brevity.

Figure 3B:
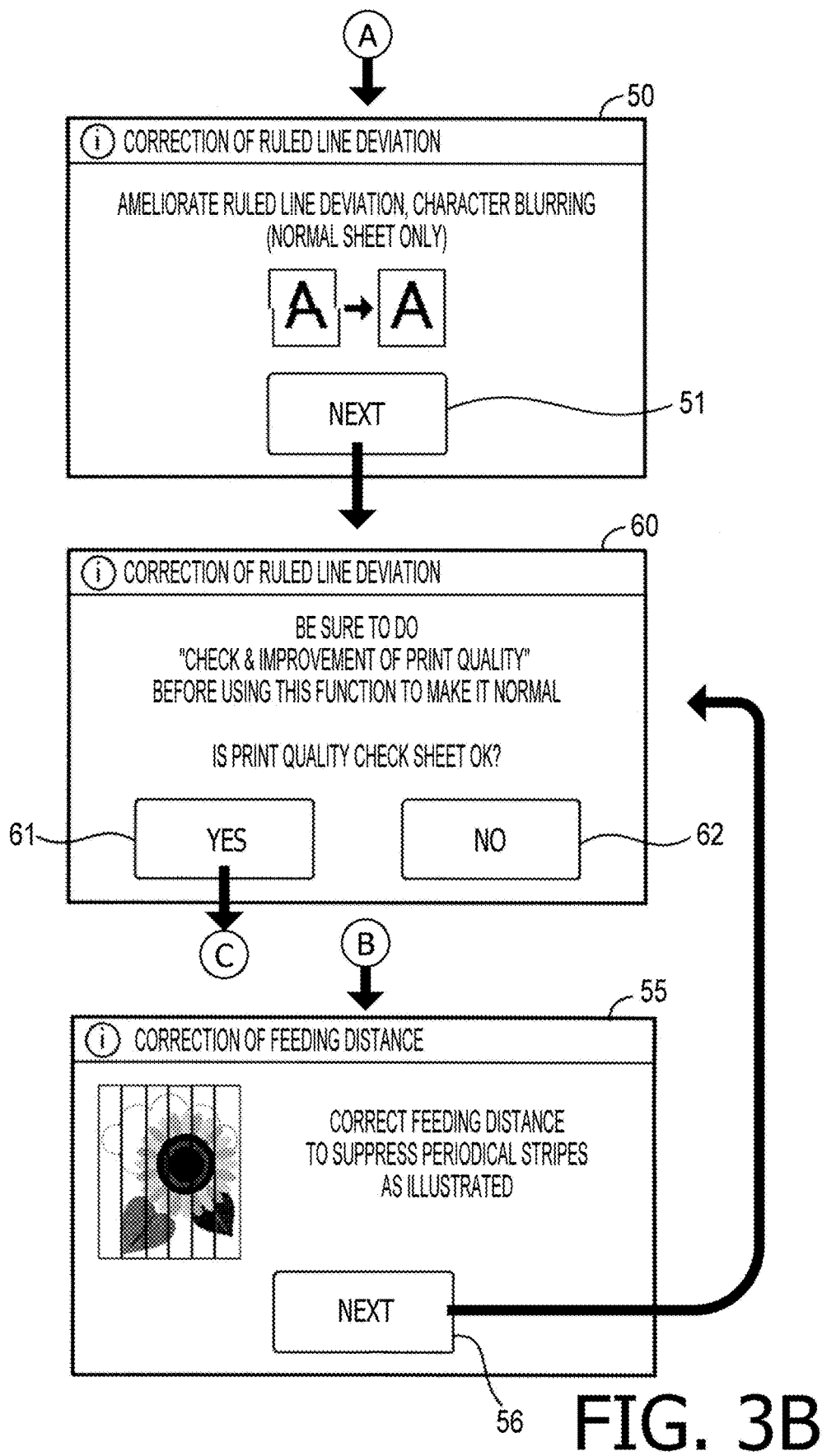
Figure 5A:
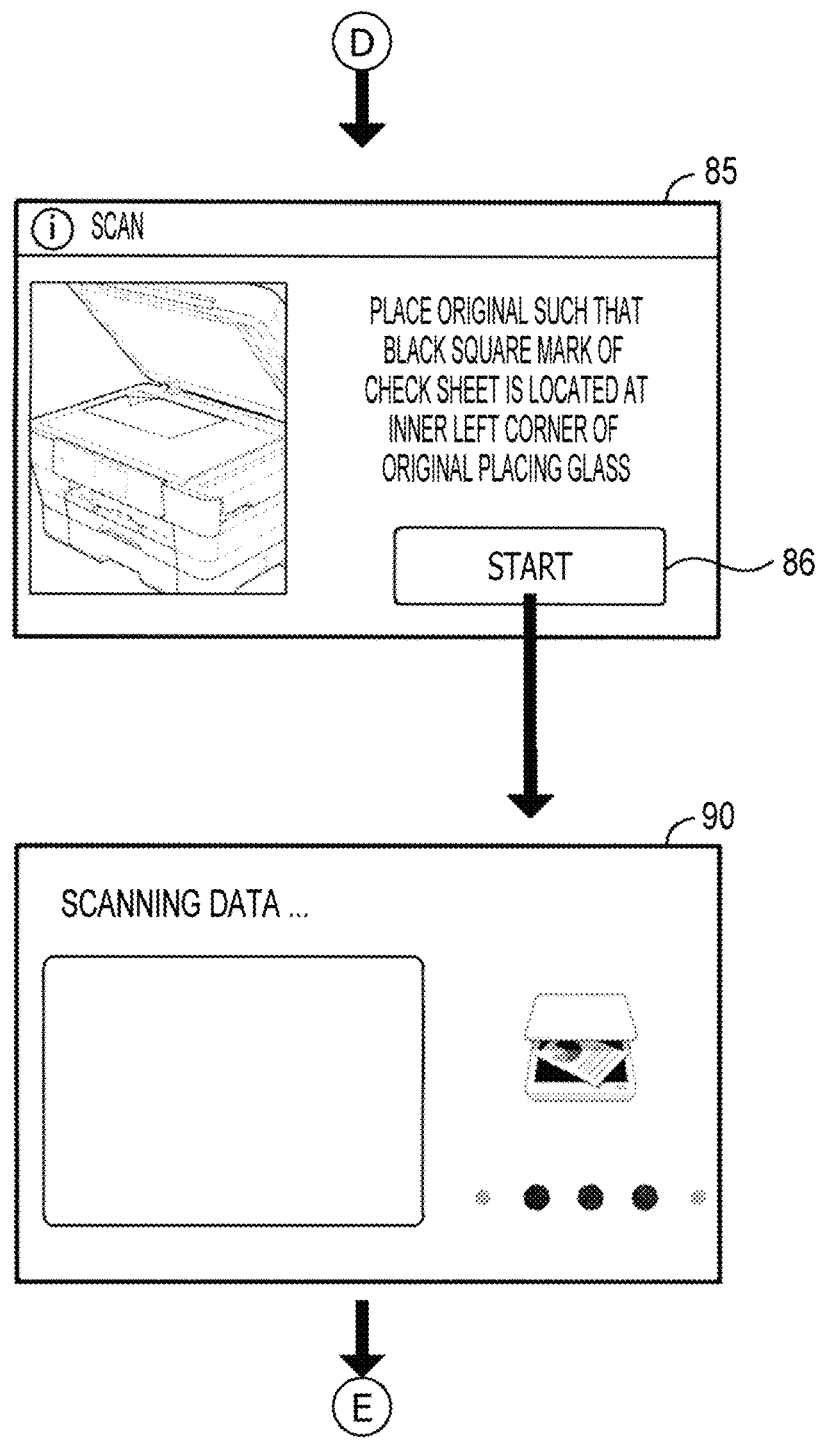

The quality confirmation screen 60 shown in FIG. 3B is a screen which is displayed when the target correcting function is the ruled line deviation correcting function. When the target correcting function is the feeding distance correcting function, the quality confirmation screen is slightly different from the quality confirmation screen 60 shown in FIG. 3B.

The quality confirmation screen 60 shown in FIG. 3B includes a message questioning whether or not the quality check image described above is normal, a "YES" button 61 and a "NO" button 62. When the "NO" button 62 is tapped, the controller 11 displays the print quality menu screen 45 described above the display 14. When the "YES" button 61 is tapped, the controller 11 displays a correcting method selection screen 65 (see FIG. 4) on the display 14.

On the correction method selection screen 65, a message asking the user whether the target correcting function is to be executed automatically or manually, an "AUTO" button 66 and a "MANUAL" button 67 are displayed. When the "MANUAL" button 67 is tapped, the target correcting function is executed in accordance with a particular manual correcting procedure associated with particular operations performed by the user. Description on concrete processes of the target correcting function in accordance with the manual correcting procedure will be omitted. When the "AUTO" button 66 is tapped, the controller 11 displays a sheet size selection screen 70 (see FIG. 4) on the display 14.

On the sheet size selection screen 70, one or more buttons respectively corresponding to one or more sheet sizes on which the correction pattern can be printed are displayed for user's selection. In the example shown in FIG. 4, an "A4" button 71 corresponding to an A4 size recording sheet and a "US LETTER" button 72 corresponding to a US letter size are shown as examples. It is noted that the selectable sheet sizes could be any sizes. When one of the sheet sizes is selected on the sheet size selection screen 70, the controller 11 displays a sheet type selection screen on the display 14. Since the sheet size selection screen 70 and the sheet type selection screen are configured to be analogical, a figure showing the sheet type selection screen will be omitted.

On the sheet type selection screen, one or more buttons respectively corresponding to one or more types of the recording sheet 35 on which the correction pattern can be printed are displayed for user's selection. The selectable sheet type could be any type. For example, the selectable sheet types may include normal sheet and glossy sheet. When one of the sheet types is selected on the sheet type selection screen, the controller 11 displays a print start screen 75 (see FIG. 4) on the display 14.

On the print start screen 75, a message indicating the sheet size and the sheet type selected in the above-described selection screens, a message prompting the user to set the recording sheet 35 corresponding to the user-selected sheet size and sheet type to a particular tray, a time period assumed to be necessary for printing the correction pattern and a "START" button 76 are displayed (see FIG. 4).

When the start button 76 is tapped, the controller 11 controls the printer 20 to print one of correction patterns corresponding to the user-selected sheet size and sheet type among a plurality of correction patterns compliant to the target correcting function on the recording sheet 35 corresponding to the user-selected sheet size and type and accommodated in one of sheet trays attached to the image processing apparatus 10 based on the currently set driving information.

In the example shown in FIG. 4, since the target correcting function is the ruled line deviation correcting function, a ruled line deviation correction pattern 210, which corresponds to the user-selected sheet size and sheet type is selected from among a plurality of ruled line deviation correction patterns 210, is printed. When the target correcting function is the feeding distance correcting function, a feeding distance correction pattern, which corresponds to the user-selected sheet size and pattern is selected from among a plurality of feeding distance correction patterns, is printed.

The controller 11 stores the pattern print history information corresponding to the currently executed target correction function at a particular history storing timing during the print executing period (e.g., the information obtaining timing).

When the correction pattern is being printed, the controller 11 displays a printing-in-process screen 80 (see FIG. 4) on the display 14. When printing of the correction pattern is completed, the controller 11 displays a scan instruction screen 85 (see FIG. 5A) on the display 14. The scan instruction screen 85 contains a message prompting the user to make the scanner 24 scan the printed correction pattern and a "START" button 86. When the user places a correction check sheet (a ruled line deviation check sheet or a feeding distance check sheet), which is the recording sheet 35 on which the correction pattern has been printed, and taps the "START" button 86, the controller 11 starts scanning the image printed on the correction check sheet.

When the "START" button 86 is tapped, the controller 11 determines whether one of a plurality of particular pre-scanning errors is occurring before starting scanning of the image. When it is determined that one of the plurality of pre-scanning errors is occurring, the controller 11 displays a pre-scanning error message indicating that a pre-scanning error is occurring on the display 14. Then, at a particular screen restoration timing after the pre-scanning error message was displayed, the controller 11 displays the scan instruction screen 85 on the display 14 again.

It is noted that the pre-scanning error could be any error. For example, one of the pre-scanning errors may be a state where a cover of the scanner 24 is opened. For another example, one of the pre-scanning errors may be a state where printing is being executed by the printer 20.

When the "START" button 86 is tapped and scanning of an image is started, the controller 11 displays a scanning-in-process screen 90 (see FIG. 5A) on the display 14 when scanning is being performed. When scanning of the image is completed, the controller 11 performs a correcting process corresponding to the target correcting function based on the scan data of the scanned image. It is noted that the controller 11 displays a correction-in-process screen 95 (see FIG. 5B) when the correcting process is being performed.

During execution of the correcting process, the controller 11 determines whether one of the plurality of particular post-scanning errors is occurring. The plurality of post-scanning errors is roughly categorized into a first error or a second error. The first error is an error representing a state in which the correcting process cannot be normally performed based on the scan data obtained this time, but the correction check sheet as printed can be re-used. That is, the first error is an error representing a state where the correcting process can be performed by re-scanning the correction check sheet as printed. The second error is an error representing a state where the correcting process cannot be performed with the correction check sheet as printed, and the correction pattern should be printed again.

The first error occurs when, for example, the correction check sheet is placed on the original table in a wrong orientation. In such a case, the correction check sheet does not have any defect. Thus, when the correction check sheet is placed on the original table in the correct orientation and scanned again, the correcting process could be performed normally. The controller 11 is configured to determine whether the correction check sheet is placed in the correct orientation based on the scan data, and determine whether the first error is occurring or not based on the determination of the correct/wrong orientation of the correction check sheet placed on the original table.

When the controller 11 determines that the first error is occurring during execution of the correcting process, the controller 11 displays a first error screen 105 (see FIG. 5A) corresponding to the first error on the display 14. The first error screen 105 contains a message indicating that the first error has occurred and a concrete content of the first error, a "RETRY" button 106 and a "CANCEL" button 107.

When the "CANCEL" button 107 is tapped, the controller 11 displays the print quality menu screen 45 (see FIG. 3A) on the display 14. When the "RETRY" button 106 is tapped, the controller 11 displays a scan instruction screen 85 (see FIG. 5A). In this case, the user can make the image processing apparatus 10 perform the correcting process by making the scanner 24 re-scan the correction check sheet which has already been printed.

When the controller 11 determines that the second error is occurring during execution of the correcting process, the controller 11 displays the print quality menu 45 (see FIG. 3A) on the display 14. When the correcting process is normally completed, the controller 11 displays a correction completion screen 100 (see FIG. 5B) on the display 14. After displaying the correction completion screen 100 continuously for a particular constant period, the controller displays the aforementioned maintenance menu screen on the display 14.

After the scan instruction screen 85 (see FIG. 5A) is displayed on the display 14, when a particular standby release condition is satisfied, the controller 11 sets the printed pattern effectiveness flag corresponding to the target correcting function to ON, and switches the screens displayed on the display 14. At this stage, for example, a standby screen 40 is displayed according to the present embodiment. The standby release condition is, for example, a condition where a non-operation timeout occurs. The non-operation timeout occurs when a particular non-operation period has elapsed before the "START" button 86 is operated.

When one of the correction functions is selected on the print quality menu screen 45, and when the printed pattern effectiveness flag corresponding to the selected correction function is set to ON, unlike the process of transition of the screens described above, printing of the correction pattern could be omitted.

For example, when the ruled line deviation correction button 47 on the print quality menu screen 45 is tapped in a state where the printed pattern effectiveness flag corresponding to the ruled line deviation correction function is set to ON (see FIG. 6A), the controller 11 start executing the ruled line deviation correcting function. In this case, the controller 11 firstly displays the sheet size selection screen 70 (see FIG. 6A). When the sheet size is selected on the sheet size selection screen 70, the controller 11 displays the sheet type selection screen (not shown). After the sheet type is selected on the sheet type selection screen, the controller 11 determines whether selected sheet size and sheet type match the pattern print history information corresponding to the ruled line deviation correcting function stored in the storage 12.

When it is determined that the selected sheet size and sheet type do not match the pattern print history information, the controller 11 performs the screen transition same as that when the printed pattern flag is set to OFF (see FIGS. 6A and 6B) as aforementioned. It is noted, however, display of the sheet size selection screen 70 and the sheet type selection screen may be omitted since the sheet size and the sheet type have already been selected in this case.

Figure 6A:
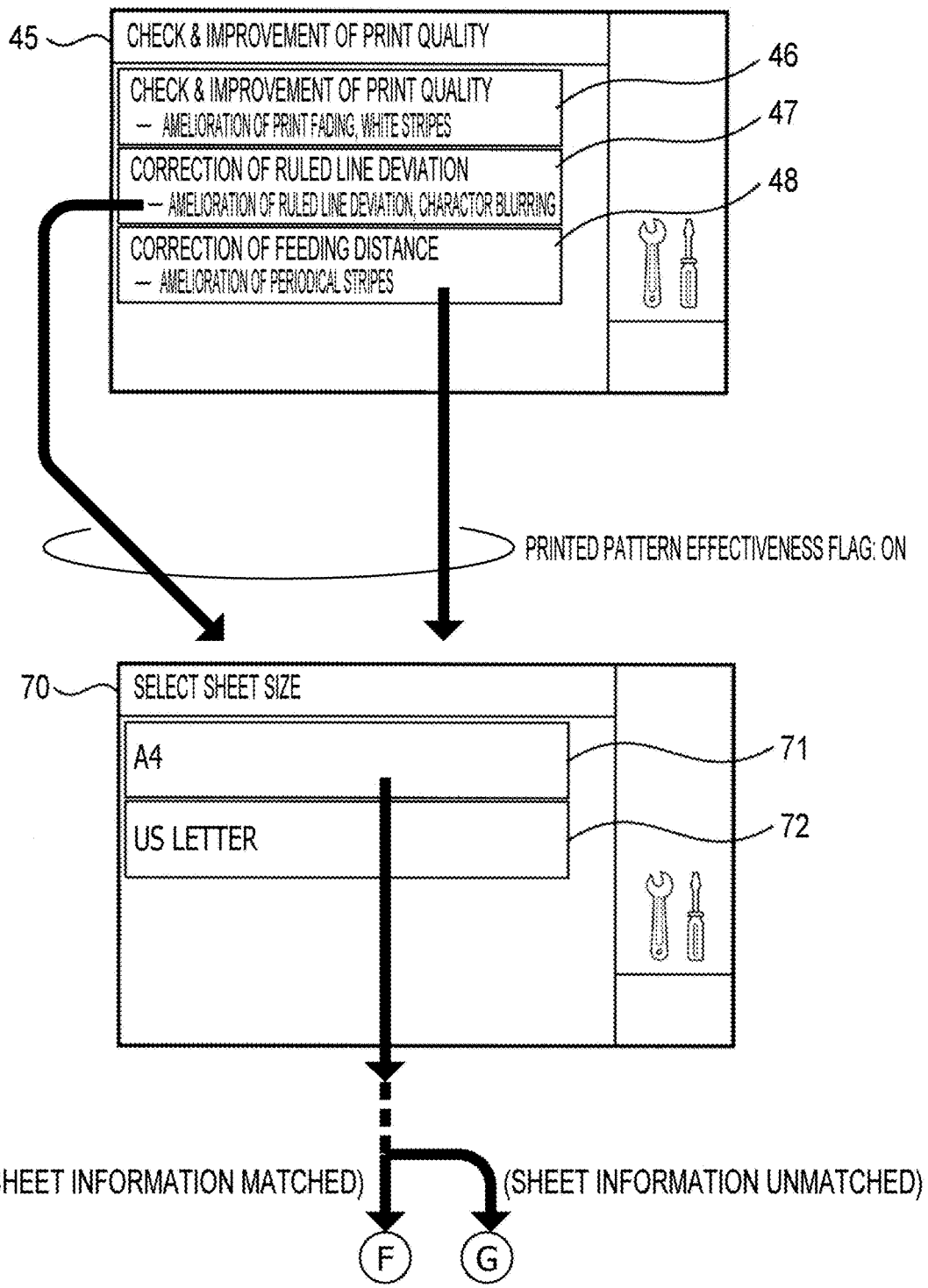
Figure 6B:
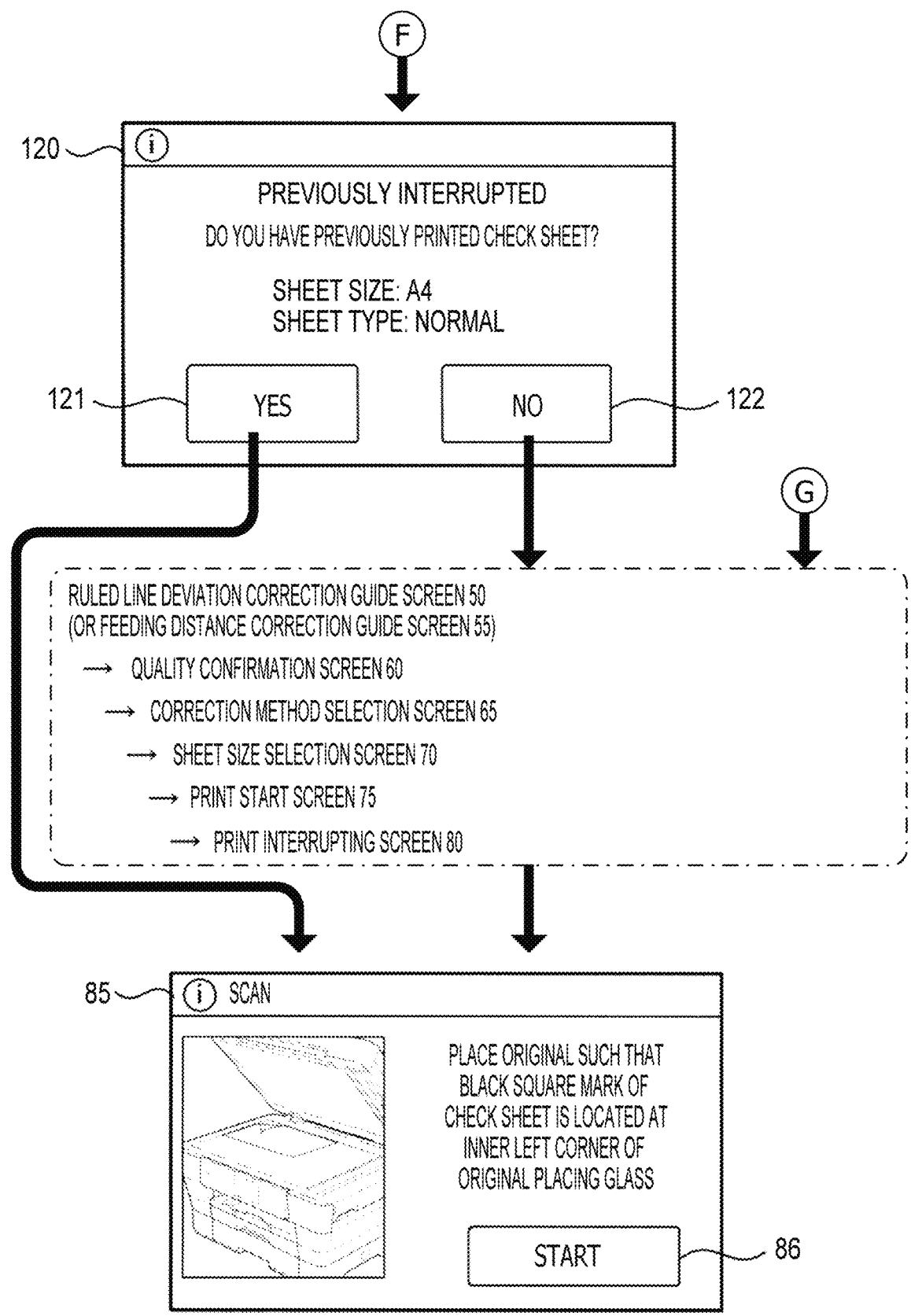

When it is determined that the selected sheet size and sheet type match the pattern print history information, the controller 11 displays a transition-to-scan confirmation screen 120 on the display 14 (see FIG. 6B). On the transition-to-scan confirmation screen 120, a message indicating that the previously printed check sheet for correction has not been scanned and a message inquiring the user whether the correcting process is to be performed using the previously printed check sheet. Further, a "YES" button 121 and a "NO" button 122 are displayed on the transition-to-scan confirmation screen 120.

When the "NO" button 122 is tapped, the controller 11 executes the screen transition same as that in a case where the printed pattern flag is set to OFF as shown in FIG. 6B. When the "YES" button 121 is tapped, the controller 11 displays a scan instruction screen 85 as shown in FIG. 6B without printing the correction pattern. The screen transition from the scan instruction screen 85 is the same as that shown in FIGS. 5A and 5B.

(4) Main Process

Hereinafter, the main process will be described in detail referring to FIGS. 8A-10B. The main process is performed by the controller 11 to realize the above-described screen transition and respective correcting functions. When the power is supplied and the controller 11 is booted, the controller 11 retrieves a program of the main process from the storage 12 and executes the same.

When the main process is started, the controller 11 sets the printed pattern effectiveness flag to OFF (S100). In S110, the controller 11 displays the standby screen 40 on the display 14. Then, the controller 11 determines whether the ink menu button 44 on the standby screen 40 is tapped (S120).

When an event other than tapping of the ink menu button 44 is issued, the controller 11 performs another process which corresponds to the issued event. When the process corresponding to the issued event has completed, the controller moves to S110. It is noted that, in response to tapping of any of function buttons 41-43 displayed on the standby screen 50, a function corresponding to the tapped one of the function buttons 41-43 is executed. Execution of such functions are included in the processes other than the main process. When the other process executed in S125 is the process including printing of an image on the recording sheet 35 using the printer 20, the controller 11 drives the printer 20 in accordance with the currently set driving information.

When the ink menu button 44 on the standby screen 40 is tapped, the controller 11 displays the maintenance menu screen mentioned above on the display 14 (S130). When the print quality maintenance button on the maintenance menu screen is tapped, the controller 11 displays the print quality menu screen 45 on the display 14 (S140).

In S150, the controller 11 determines which of the plurality of buttons 46, 47 and 48 on the print quality menu screen 45 is tapped. When it is determined that the check button 46 is tapped, the controller 11 moves to S160 to perform a quality checking process.

When it is determined that the ruled line deviation correction button 47 or the feeding distance correction button 48 is tapped, the controller 11 executes a correcting function corresponding to the tapped button (i.e., the target correcting function).

For example, after it is determined in S150 that the ruled line deviation correction button 47 or the feeding distance correction button 48 is tapped, the controller 11 determines whether the printed pattern effectiveness flag corresponding to the target correcting function is set to ON in S170.

When it is determined that the printed pattern effectiveness flag is set to OFF (S170: NO), the controller 11 displays a correction guidance screen corresponding to the target correcting function (i.e., the ruled line deviation correction guidance screen 50 or the feeding distance correction guidance screen 55) on the display 14. Thereafter, when a "NEXT" button arranged on the displayed correction guidance screen is tapped, the controller 11 proceeds to S450.

In S450, the controller 11 requests the user to input whether a quality check sheet is normal. Concretely, the controller 11 displays the quality confirmation screen 60 on the display 14. It is noted that the quality check sheet means the recording sheet 35 on which an image to be used for a quality check is printed. When the "NO" button 62 on the quality confirmation screen 60 is tapped (i.e., when the user's input indicates that the quality check sheet is not normal) (S450: NO), the controller 11 displays a check recommendation screen (not shown) on the display 14 (S490) j, the controller 11 moves to S140.

When the "YES" button 61 on the quality confirmation screen 60 is tapped (i.e., when the user's input indicates that the quality check sheet is normal) (S450: YES), the controller 11 inquires the user whether the correcting method is automatic or manual. Specifically, the controller 11 displays a correction method selection screen 65 on the display 14 to receive a user's input.

When the "MANUAL" button 67 on the correction method selection screen 65 is tapped (S460: MANUAL), the controller 11 performs the manual correcting process (S500). That is, the controller 11 executes the target correcting function in accordance with the particular manual correcting procedure mentioned above. After execution of the manual correcting process, the controller 11 moves to S330 (see FIG. 10A).

When the "AUTO" button 66 on the correction method selection screen 65 is tapped (S460: AUTO), the controller 11 receives, in S470, a selection of the sheet size and a selection of the sheet type of the recording sheet 35 on which the correction pattern is to be printed. For example, the controller 11 sequentially displays the sheet size selection screen 70 and the sheet type selection screen (not shown) on the display 14 to prompt the user to select a sheet size and a sheet type.

In S480, the controller 11 prints the correction pattern corresponding to the target correcting function on the recording sheet 35 of which sheet size and sheet type are those selected in S470 in accordance with the currently set driving information. When printing is being performed, the controller 11 displays the printing-in-process screen 80 on the display 14. Further, as aforementioned, the controller 11 stores the pattern print history information corresponding to the target correcting function. After printing of the correction pattern is completed, the controller 11 moves to S220 (see FIG. 9). It is noted that, before printing is started, the controller 11 displays the print start screen 75 (see FIG. 4) on the display 14.

When it is determined that the printed pattern effectiveness flag is set to be ON (S170: YES), the controller 11 receives, as in S470, the selection of the sheet size and sheet type of the recording sheet 35 onto which the correction pattern is to be printed in S180. In S190, the controller 11 determines whether the selected sheet size and sheet type, which are received in S180, match the sheet size and sheet type of the recording sheet 35 on which the correction pattern corresponding to the target correcting function was previously printed, referring to the pattern print history information, which is stored in the storage 12 and corresponds to the target correcting function.

When the selected sheet size and sheet type do not match the corresponding pattern print history information (S190: NO), the controller 11 proceeds to S440. When the selected sheet size and sheet type match the corresponding pattern print history information (S190: YES), the controller 11 displays the transition-to-scan confirmation screen 120 (see FIG. 6B) on the display 14 (S200). Then, the controller 11 awaits a user instruction as to whether the previously printed correction check sheet is to be re-used (i.e., a user operation on the transition-to-scan confirmation screen 120) in S210.

When the "NO" button 122 on the transition-to-scan confirmation screen 120 is tapped (S210: NO), the controller 11 proceeds to S440. When the "YES" button 121 is tapped, the controller 11 proceeds to S200 (see FIG. 9).

In S220, the controller 11 displays the scan instruction screen 85 on the display 14. Then, in S230, the controller 11 determines whether an even is occurred when the scan instruction screen 85 is being displayed.

When the return key 15c is depressed during a period in which the scan instruction screen 85 is being displayed (S230: DEPRESSION OF RETURN KEY), the controller 11 determines whether the printed pattern effectiveness flag is set to be ON in S550. When it is determined that the printed pattern effectiveness flag is set to be OFF (S550: NO), the controller 11 outputs a refusal sound, which is a sound indicating the user operation of tapping the return key 15c is rejected, through a speaker (not shown) provided to the image processing apparatus 10, and proceeds to S220. That is, in this case, the user's depression of the return key 15c is invalidated. When it is determined that the printed pattern effectiveness flag is set to be ON (S550: YES), the controller 11 proceeds to S200 (see FIG. 8B).

When the home key 15b is depressed while the scan instruction screen 85 is being displayed (S230: DEPRESSION OF HOME KEY), the controller 11 displays a correction cancellation confirmation screen (not shown) in S570. It is noted that the correction cancellation confirmation screen is a screen asking the user whether execution of the correcting function should be cancelled. Then, in S580, the controller 11 determines whether a cancellation instructing operation on the correction cancellation confirmation screen has been performed. When it is determined that the cancellation instructing operation has not been performed (S580: NO), the controller 11 moves to S220. When it is determined that the cancellation instructing operation has been performed (S580: YES), the controller 11 moves to S110 and displays the standby screen 40 on the display 14.

When the aforementioned non-operation timeout has occurred when the scan instruction screen 85 is being displayed (S230: NON-OPERATION TIMEOUT), the controller 11 sets the printed pattern effectiveness flag corresponding to the target correcting function to ON (S590) and moves to S110. That is, when a particular non-operation time period has elapsed without the "START" button 86 being tapped, the controller 11 sets the printed pattern effectiveness flag to ON and switches the screen to be displayed on the display 14 from the scan instruction screen 85 to the standby screen 40.

When the "START" button 86 is tapped while the scan instruction screen 85 is being displayed (S230: TAP OF START BUTTON), the controller 11 moves to S240 (see FIG. 10A). It is assumed, in this case, that the correction check sheet corresponding to the target correction function has already been placed on the original table by the user before the "START" button 86 is tapped.

In S240, the controller 11 determines whether a pre-scanning error occurs. When it is determined that the pre-scanning error occurs (S240: YES), the controller 11 displays a scanning-inexecutable screen (not shown) corresponding to the type of currently occurring pre-scanning error on the display 14 (S420). On the scanning-inexecutable screen, the aforementioned pre-scanning error message is also displayed. Thereafter, at the aforementioned screen restoration timing, the controller 11 moves to S220 and displays scan instruction screen 85 on the display 14.

When it is determined that the pre-scanning error is not occurring (S240: NO), the controller 11 moves to S250 and displays the scanning-in-process screen 90 on the display 14 (S250). In S260, the controller 11 determines whether the previously printed correction check sheet is to be used. For example, a process of S210 is performed and, in the process, when the "YES" button 121 on the transition-to-scan confirmation screen 120 is tapped (S260: YES), the controller 11 determines that the previously printed correction check sheet can be used and moves to S270.

In S270, the controller 11 scans the image of the correction check sheet placed on the original table, that is, the correction pattern, based on the sheet size of the correction check sheet corresponding to the previously printed target correcting function. That is, the controller 11 scans the correction pattern using the sheet size of the previously printed correction check sheet as the scanning range.

When it is determined that the previously printed correction check sheet is not used (S260: NO), the controller 11 proceeds to S280. In S280, the controller 11 scans the image of the correction check sheet placed on the original table based on the sheet size of the correction check sheet printed in S480. In this case, the controller 11 scans the correction pattern using the sheet size of the correction check sheet printed this time.

In S290, the controller 11 displays a correction-in-process screen 95 on the display 14. Then, in S300, the controller 11 analyzes the obtained scan data and calculates the correction value for the driving information corresponding to the target correcting function (i.e., the aforementioned ejection correction value or the feeding amount correction value).

In S310, the controller 11 determines whether the post-scanning error has occurred. When it is determined that the post-scanning error has occurred (S310: YES), the controller 11 proceeds to S360. In S360, the controller 11 determines whether the post-scanning error currently occurring is the first error mentioned above. When it is determined that the post-scanning error is not the first error (S360: NO), that is, when the post-scanning error is the second error, the controller 11 displays a second error screen 11 on the display 14 (S380). When a "CLOSE" button 111 on the second error screen 110 is tapped, the controller 11 proceeds to S400.

When it is determined that the occurring post-scanning error is the first error (S360: YES), the controller 11 displays a first error screen 105 on the display 14. In S390, the controller 11 determines whether scanning is to be retried. Concretely, the controller 11 determines whether a "RETRY" button 106 on the first error screen 105 is tapped. When it is determined that the "RETRY" button 106 is tapped (S390: YES), the controller 11 moves to S220 (FIG.

9) and displays the scan instruction screen 85 with holding a state where the printed pattern effectiveness flag is set to be ON. Accordingly, the user can make the image processing apparatus 10 scan the correction check sheet again to continue the correction function. When it is determined that a "HALT" button 107 on the first error screen 105 is tapped (S390: NO), the controller 11 proceeds to S400.

Figure 8A:
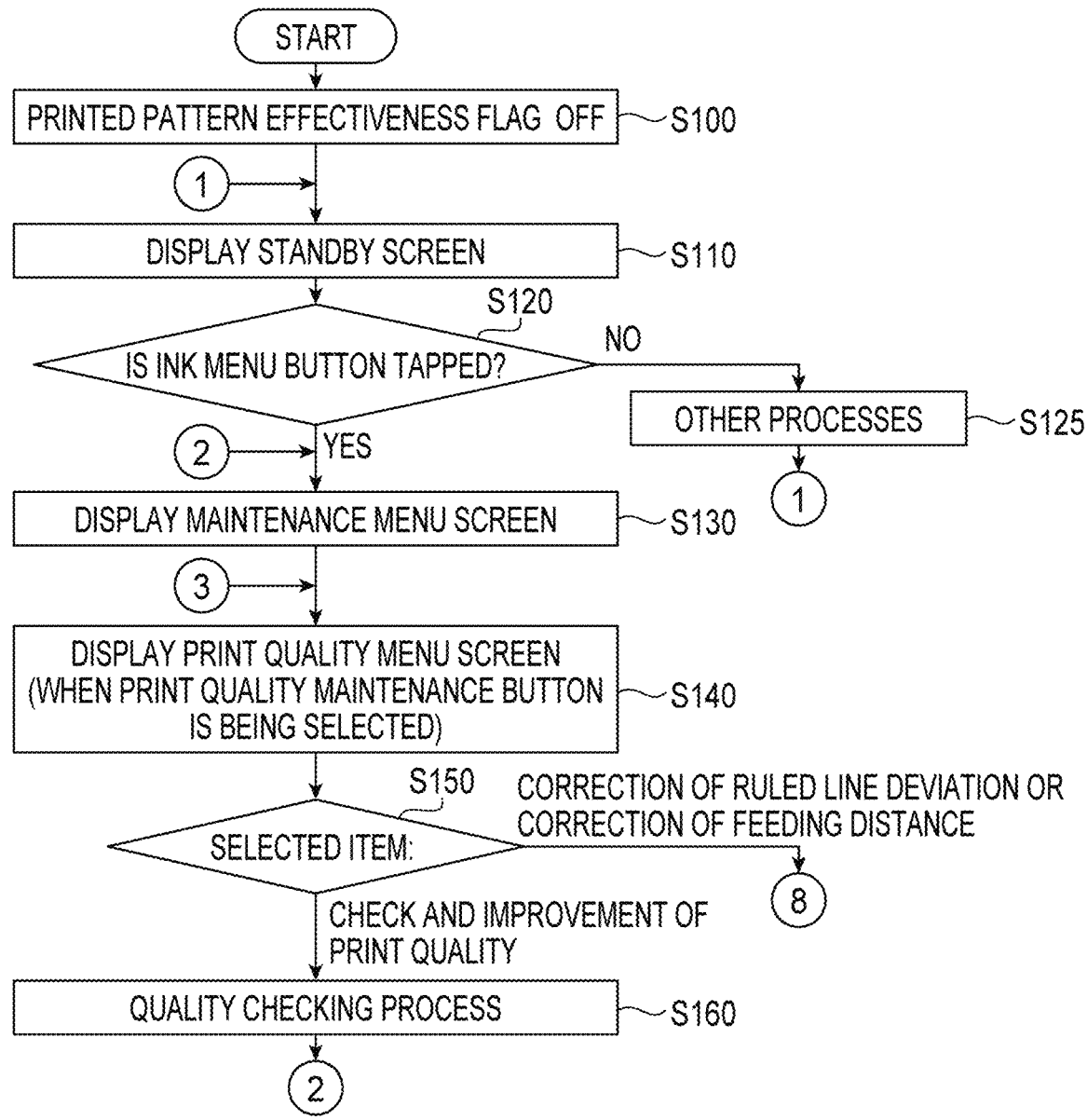
FIGS. 8A, 8B, 9, 10A and 10B show a flowchart illustrating a main process of the image processing apparatus.
Figure 8B:
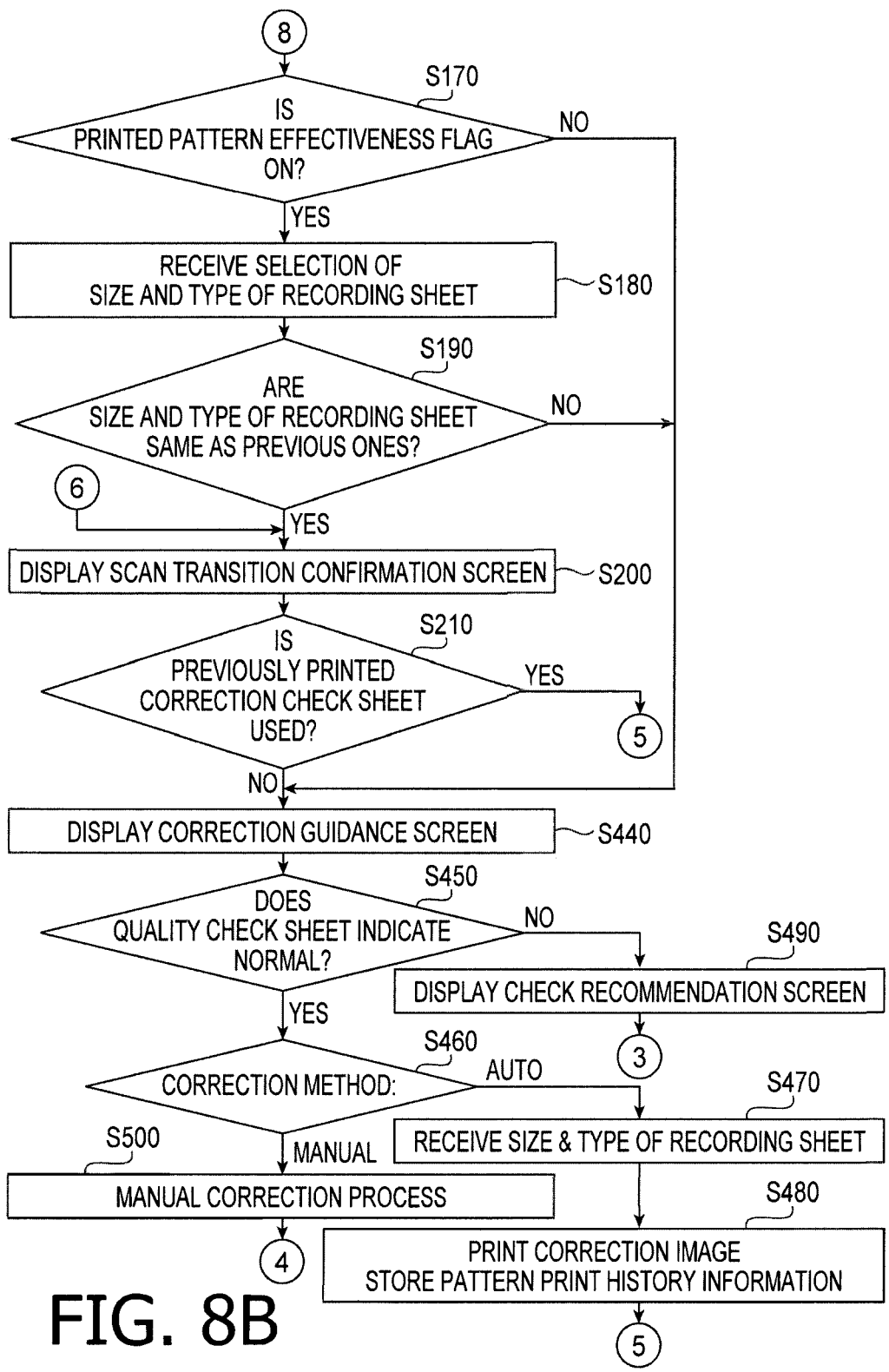
Figure 9:
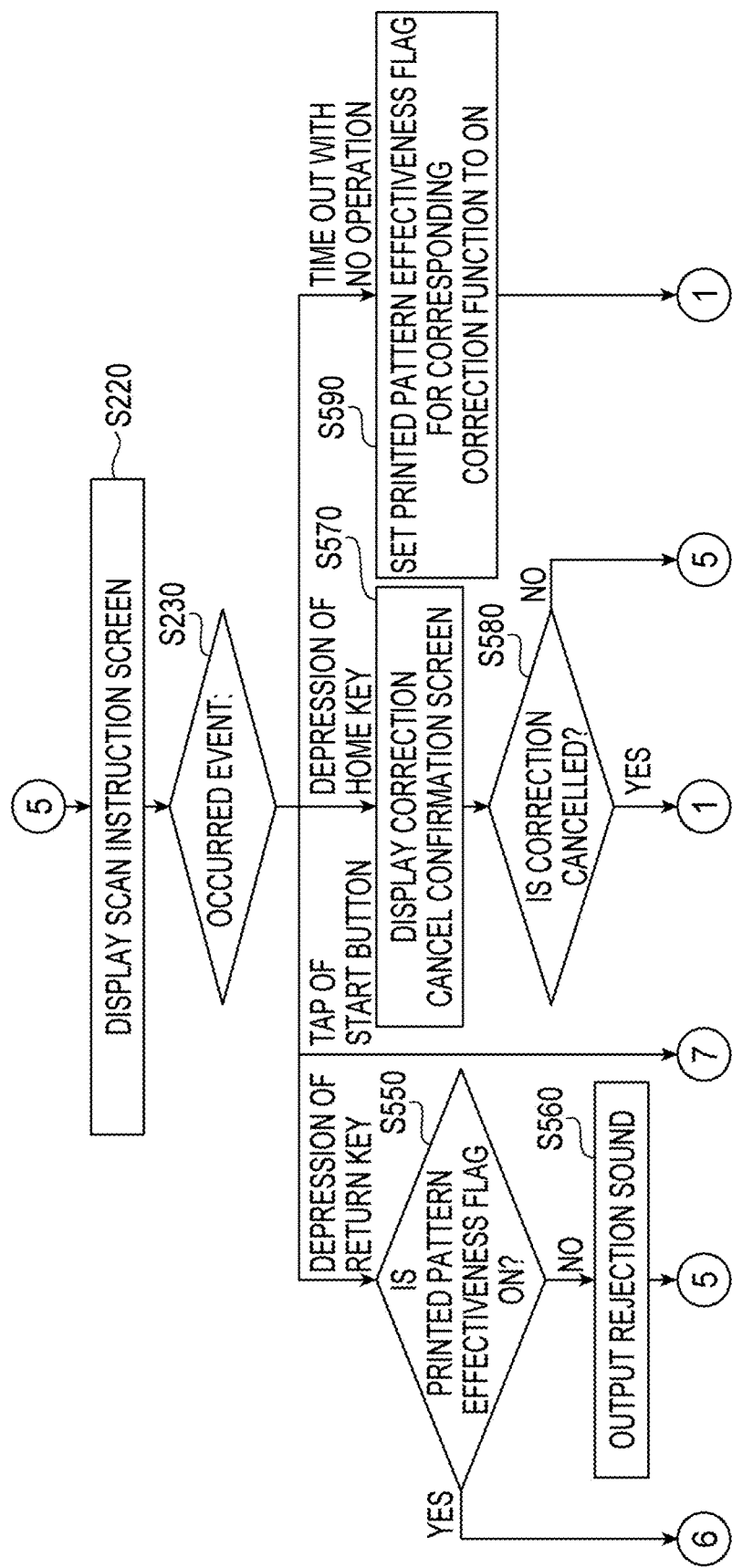
Figure 10A:
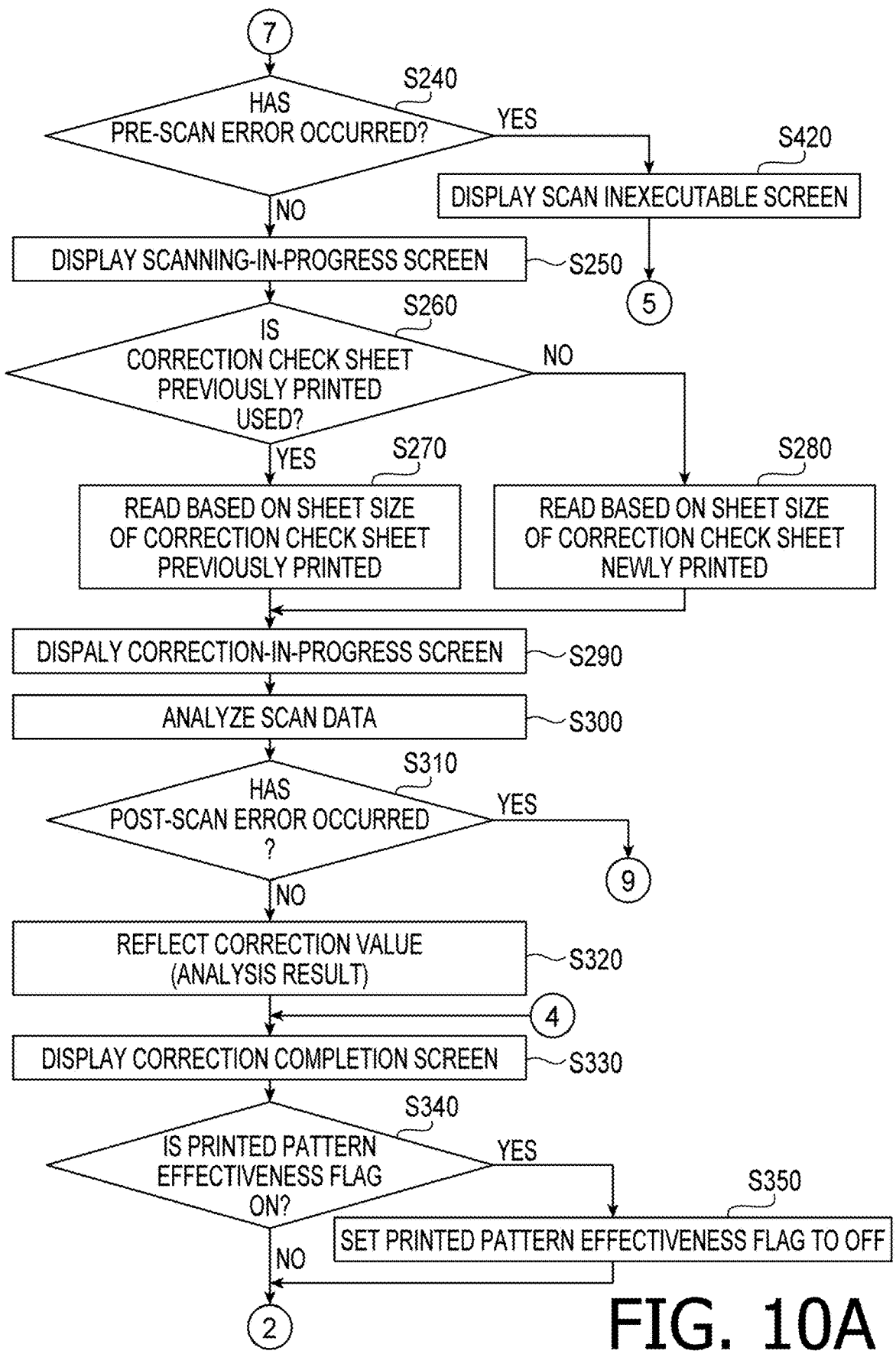
Figure 10B:
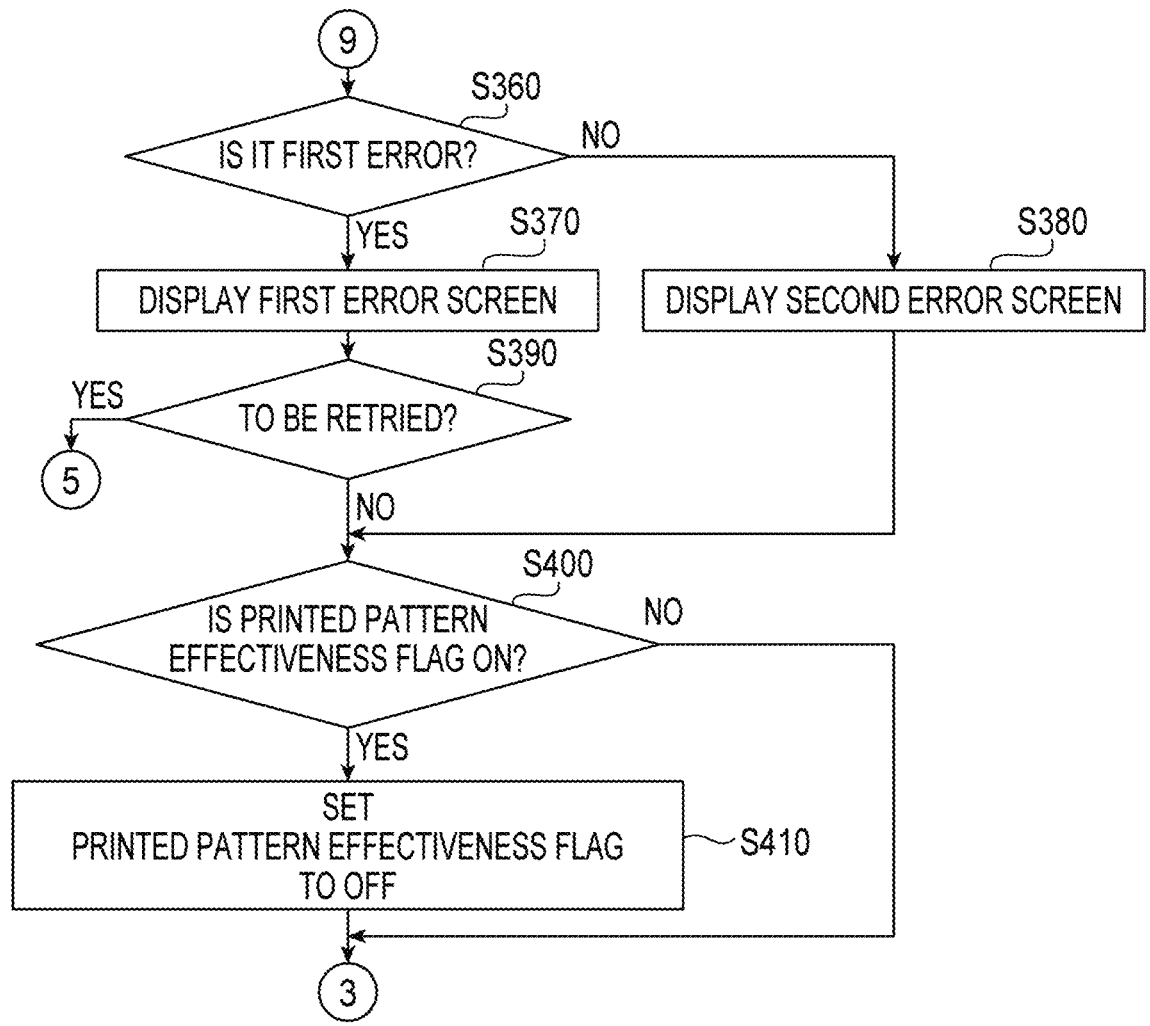

In S400, the controller 11 determines whether the printed pattern effectiveness flag is set to be ON. When it is determined that the printed pattern effectiveness flag is set to be OFF (S400: NO), the controller 11 proceeds to S140 (FIG. 8A). When it is determined that the printed pattern effectiveness flag is set to be ON (S400: YES), the controller 11 sets the printed pattern effectiveness flag to be OFF and proceeds to S140.

When it is determined that the post-scanning error has not occurred (S310: NO), the controller 11 proceeds to S320. In S320, the controller 11 reflects the correction value of the driving information corresponding to the target correcting function calculated in S300 to the currently set driving information. Concretely, as aforementioned, the controller 11 stores the calculated correction value in the storage 12 or s correct the currently set driving information using the correction value calculated this time, thereby updating the driving information.

In S330, the controller 11 displays the maintenance menu screen (not shown) after displaying a correction completion screen 100 for a particular fixed period. In S340, the controller 11 determines whether the printed pattern effectiveness flag is set to be ON. When it is determined that the printed pattern effectiveness flag is set to be OFF (S340: NO), the controller 11 moves to S130 (FIG. 8A). When it is determined that the printed pattern effectiveness flag is set to be ON (S340: YES, the controller 11 moves to S350 where the controller 11 sets the printed pattern effectiveness flag to be OFF. Thereafter, the controller 11 moves to S130.

(5) Effects of the Illustrative Embodiment

According to the illustrative embodiment, at least effects (a)-(f) are achieved.

(a) According to the image processing apparatus 10, when the non-operation timeout occurs after the correction pattern of the target correcting function is printed and the scan instruction screen 85 is displayed, the controller 11 switches the screen displayed on the display 14 to the standby screen 40.

When execution of the same target correcting function is instructed thereafter, and when it is determined that the printed pattern effectiveness flag corresponding to the target correcting function is set to be ON, the transition-to-scan confirmation screen 120 is displayed as shown in FIG. 6B. Thereafter, when the "YES" button 121 on the transition-to-scan confirmation screen 120 is tapped, the controller 11 displays the scan instruction screen 85 without printing the correction pattern.

Therefore, even if the non-operation timeout has occurred after the correction pattern was printed, it becomes possible that the correction function can be executed using the correction pattern which has already been printed. Accordingly, in the image processing apparatus 10, a function of automatically updating the driving information is improved.

(b) When the correcting process has normally completed, the controller 11 sets the printed pattern effectiveness flag to be OFF. Therefore, when a correction request is input again thereafter, the controller 11 prints the correction pattern, thereby appropriate correcting process being performed based on the printed correction pattern.

(c) Even if the correcting process has not been normally completed, the controller 11 basically sets the printed pattern effective flag to be OFF. Accordingly, when the correction request is input thereafter, the controller 11 can print the correction pattern and performs the appropriate correcting process based on the printed correction pattern.

(d) Even when the correcting process has not been normally completed, if it caused as the first error occurred, the controller 11 does not set the printed pattern effectiveness flag to OFF. Therefore, when the correcting process is interrupted due to occurrence of the first error, the controller 11 can continue the correcting process using the correction pattern which has already been printed.

(e) When the correcting function is executed, the controller receives the user selection of the size and type of the recording sheet 45 on which the correction pattern is to be printed as the pattern print history information as the pattern print history information. Then, as shown in FIG. 6A, when one of the correcting functions is selected from the print quality menu screen 45 in a state where the printed pattern effectiveness flag is set to be ON, the controller 11 receives the user's selection of the sheet size and the sheet type. Then, when the selected sheet size and the selected sheet type match the pattern print history information stored in the storage 12, the controller 11 receives the selected sheet size and the selected sheet type. Further, when the selected sheet size and sheet type match the stored pattern print history information which is stored in the storage 12, the controller 11 displays the transit-to-scan confirmation screen 120.

That is, when the sheet size and the sheet type of the correction check sheet on which the correction pattern has already been printed and those of the correction check sheet on which the correction pattern will be printed match (i.e., coincide), the controller 11 allow reuse of the correction check sheet on which the correction pattern has already been printed. Therefore, the correcting process using the correction check sheet on which the correction pattern has already been printed, after occurrence of the non-operation timeout, can be performed effectively and appropriately.

(f) According to the embodiment, the two pieces of driving information (i.e., the ejection driving information and the feed driving information) are corrected independently. Therefore, the ruled line deviation and the feeding distance which could occur when the printer 20 prints images can be suppressed easily and effectively.

It is noted that, in the above-described embodiment, the recording sheet 35 is an example of a recording medium. The sheet feeding mechanism 23 is an example of a feeder. The recording head 21 is an example of an ink ejecting part. The printed pattern effectiveness flag set to be ON is an example of non-completion information. The sheet size and the sheet type are examples of medium attribute. The sheet size information and the sheet type information included in the pattern print history information are examples of medium attribute information. The scan instruction screen 85 is an example of a scan notification screen.

The process in S125 is an example of a normal printing process. The process in S480 is an example of a pattern printing process. The process in S220 is an example of a notification displaying process. The process in S230 is an example of a scanning request receiving process). The processes in S270 and S280 is examples of an image scanning process. The processes in S300 and S320 are examples of a correcting process. The process in S590 is an example of an information setting process. The process of transition from S590 to S110 is an example of a screen switching process. The processes in S200 and S210 are examples of a necessity/unnecessity receiving process. The process in S350 is an example of a first releasing process. The process in S410 is an example of a second releasing process. The process of S360 is an example of a reuse determining process. The processes in S180 and S470 are examples of a medium attribute receiving process. The process in S500 is an example of a second correcting process. The process in S500, S330, S340 and S350 is an example of a third releasing process. The process in S100 is an example of a fourth releasing process.

2. Other Embodiments

It is noted that aspects of the present disclosures need not be limited to the above-described embodiment (i.e., the first embodiment), but can be modified in various ways to provided further embodiments.

(2-1) The screens shown in FIGS. 5A-8B are only examples of respective screens, and each screen can be modified in various ways.

(2-2) Each of the ruled line deviation correction pattern and the feeding distance correction pattern need not be limited to be differentiated for each of the sheet sizes and sheet types. For example, the same correction pattern may be used regardless of the sheet type if the sheet sizes of recording sheets are the same. Optionally or alternatively, the same correction pattern may be used for particular two or more recording sheets having different sheet sizes.

(2-3) It is noted that the ruled line deviation correction pattern 210 shown in FIG. 7 is only an example. The ruled line deviation correction pattern may be any other images. So are the feeding distance correction pattern.

(2-4) The printer 20 may have a configuration different from one according to the inkjet printing technique. For example, the printer 20 may have a configuration in accordance with an electrophotographic imaging technique and may be configured as a so-called page printer. In such a case, the above-described aspects of the present disclosures may be applied to suppress deterioration of the quality of images printed by such a page printer.

(2-5) It is noted aspects of the present disclosures can be modified such that a plurality of functions of one component in the above-described embodiments may be realized by a plurality of components. It is also noted that a single function of a single component of the above-described embodiments may be achieved by a plurality of components. Further, a plurality of functions achieved by a plurality of components may be achieved by a single component, and a single function achieved by a plurality of components may be achieved by a single component. Further, a part of components of the above-described embodiments may be omitted. Still further, at least a part of the components of one of the above-described embodiments may be added to or replace another of above-described embodiments. It is noted that any modes derived from aspects of the present disclosures should considered to be included in the aspects of the present disclosures.

What is claimed is:

1. An image processing apparatus, comprising:
an input section;
a display;
a storage;
a printer configured to print an image on a recording medium;
a scanner configured to scan an image; and
a controller,
wherein the controller is configured to perform:
a normal printing process of driving the printer based on driving information to print an image on the recording medium in accordance with print data;
when a correction request of the driving information is input through the input section, a pattern printing process of printing correction pattern representing an image corresponding to the input correction request on the recording medium by driving the printer based on the driving information;
after the correction pattern is printed in the pattern printing process, a notification displaying process of displaying a scan notification screen prompting to scan the printed correction pattern using the scanner;
when the scan notification screen is being displayed on the display, a scanning request receiving process of receiving a scanning request of the printed correction pattern through the input section;
when the scanning request is received in the scanning request receiving process, an image scanning process of scanning an image with the scanner;
a correcting process of correcting the driving information based on a scanned image which is an image scanned in the image scanning process;
when a particular standby condition is satisfied without the scanning request being received in the scanning request receiving process after the scan notification screen is displayed in the notification displaying process, an information setting process of setting non-completion information corresponding to the input correction request in the storage;
when a particular standby release condition is satisfied without the scanning request is received in the scanning request receiving process after the scan notification screen is displayed in the notification displaying process, a screen switching process of displaying, on the display, a screen corresponding to the satisfied standby release condition instead of the scan notification screen at a particular timing after the standby release condition is satisfied; and
when the correction request is input through the input section in a non-complete state in which the non-completion information is set in the storage and a screen different from the scan notification screen is being displayed on the display, a necessity determination receiving process of receiving necessity determination of the pattern printing process through the input section,
wherein, when it is designated in the necessity determination receiving process that the pattern printing process is unnecessary, the controller performs the notification displaying process without performing the pattern printing process.

2. The image processing apparatus according to claim 1, wherein the controller is further configured to perform a first releasing process of releasing the non-completion information set to the storage when the correcting process has completed normally.

3. The image processing apparatus according to claim 2, wherein the controller further performs a second releasing process of releasing the non-completion information set to the storage when the correcting process has not completed normally.

4. The image processing apparatus according to claim 3, wherein, when the correcting process has not completed normally, the controller performs a reuse determining process determining whether the printed correction pattern, which corresponds to the scanned image used in the correcting process that has not completed normally, is a reusable pattern enabling the correcting process to be completed normally, and wherein, when the correcting process has not completed normally and when it is determined in the reuse determining process that the printed correction pattern is the reusable pattern, the controller retains the non-completion information stored in the storage without performing the second releasing process.

5. The image processing apparatus according to claim 1, wherein, when a correction request of the driving information is input through the input section, the controller performs a medium attribute receiving process of receiving designation of a medium attribute indicating the recoding medium through the input section, wherein the pattern printing process is configured to print the correction pattern corresponding to the medium attribute received by the medium attribute receiving process, wherein the non-completion information includes medium attribute information indicating the medium attribute corresponding to the correction pattern printed in the pattern printing process, and wherein, when the correction request is input through the input section in the non-completion state, and when the medium attribute received in the medium attribute receiving process corresponds to the medium attribute indicated by the medium attribute information included in the non-completion information, the controller performs the necessity determination receiving process.

6. The image processing apparatus according to claim 5, wherein the medium attribute includes a size of the recording medium.

7. The image processing apparatus according to claim 5, wherein the medium attribute includes a type of the recording medium.

8. The image processing apparatus according to claim 1, wherein the printer comprises:
    a feeder configured to feed the recording medium in a feeding direction; and
    an ink ejecting part configured to eject ink to the recording medium fed by the feeder as being moved bidirectionally along a scanning line perpendicular to the feeding direction,
wherein the driving information includes feed driving information used to drive the feeder and ejection driving information used to drive the ink ejecting part,
wherein the correction request includes correction target information indicating which of the feed driving information and the ejection driving information is subject to the correcting process,
wherein the pattern printing process is configured to print the correction pattern corresponding to the correction target information included in the correction request,
wherein the correction process is configured to correct the driving information corresponding to the correction target information included in the correction request,
wherein the information setting process is configured to set the non-completion information to each piece of the correction target information included in the correction request independently, and
wherein, when the correction request is input through the input section in the non-completion state and when the non-completion information corresponding to the correction target information contained in the input correction request, the controller performs the necessity determination receiving process.

9. The image processing apparatus according to claim 1, wherein, given that the correction request is a first correction request and the correcting process is a first correcting process, the controller is configured to perform:
    in response to a second correction request with respect to the driving information through the input section, a second correcting process of correcting for the driving information in accordance with a particular procedure different from the first correcting process;
    when the second correcting process is performed in a state where the non-completion information is set to the storage, a third releasing process of releasing the non-completion information set to the storage.

10. The image processing apparatus according to claim 1, wherein, when the controller is booted, the controller performs a fourth releasing process of releasing the non-completion information stored in the storage is released.

11. A method of controlling an image processing apparatus having an input section, a display, a storage;
    a printer configured to print an image on a recording medium and a scanner configure to scan an image,
    the method comprising:
    a normal printing step of driving the printer based on driving information to print an image on the recording medium in accordance with print data;
    when a correction request of the driving information is input through the input section, a pattern printing step of printing correction pattern representing an image corresponding to the input correction request on the recording medium by driving the printer based on the driving information;
    after the correction pattern is printed in the pattern printing step, a notification displaying step of displaying a scan notification screen prompting to scan the printed correction pattern using the scanner;
    when the scan notification screen is being displayed on the display, a scanning request receiving step of receiving a scanning request of the printed correction pattern through the input section;
    when the scanning request is received in the scanning request receiving step, an image scanning step of scanning an image with the scanner;
    a correcting step of correcting the driving information based on a scanned image which is an image scanned in the image scanning step;
    when a particular standby condition is satisfied without the scanning request being received in the scanning request receiving step after the scan notification screen is displayed in the notification displaying step, an information setting step of setting non-completion information corresponding to the input correction request in the storage;
    when a particular standby release condition is satisfied without the scanning request is received in the scanning request receiving step after the scan notification screen is displayed in the notification displaying step, a screen switching step of displaying, on the display, a screen corresponding to the satisfied standby release condition instead of the scan notification screen at a particular timing after the standby release condition is satisfied; and
    when the correction request is input through the input section in a non-complete state in which the non-completion information is set in the storage and a screen different from the scan notification screen is being displayed on the display, a necessity determination receiving step of receiving necessity determination of the pattern printing step through the input section, wherein, when it is designated in the necessity determination receiving step that the pattern printing step is unnecessary, the controller performs the notification displaying step without performing the pattern printing step.

12. A non-transitory computer-readable recording medium for an image processing apparatus having an input section, a display, a storage, a printer configured to print an image on a recording medium, a scanner configure to scan an image and a controller, wherein the recoding medium stores instructions which cause, when executed by the controller, the image processing apparatus to perform:

a normal printing process of driving the printer based on driving information to print an image on the recording medium in accordance with print data;

when a correction request of the driving information is input through the input section, a pattern printing process of printing correction pattern representing an image corresponding to the input correction request on the recording medium by driving the printer based on the driving information;

after the correction pattern is printed in the pattern printing process, a notification displaying process of displaying a scan notification screen prompting to scan the printed correction pattern using the scanner;

when the scan notification screen is being displayed on the display, a scanning request receiving process of receiving a scanning request of the printed correction pattern through the input section;

when the scanning request is received in the scanning request receiving process, an image scanning process of scanning an image with the scanner;

a correcting process of correcting the driving information based on a scanned image which is an image scanned in the image scanning process;

when a particular standby condition is satisfied without the scanning request being received in the scanning request receiving process after the scan notification screen is displayed in the notification displaying process, an information setting process of setting non-completion information corresponding to the input correction request in the storage;

when a particular standby release condition is satisfied without the scanning request is received in the scanning request receiving process after the scan notification screen is displayed in the notification displaying process, a screen switching process of displaying, on the display, a screen corresponding to the satisfied standby release condition instead of the scan notification screen at a particular timing after the standby release condition is satisfied; and when the correction request is input through the input section in a non-complete state in which the non-completion information is set in the storage and a screen different from the scan notification screen is being displayed on the display, a necessity determination receiving process of receiving necessity determination of the pattern printing process through the input section, wherein, when it is designated in the necessity determination receiving process that the pattern printing process is unnecessary, the controller performs the notification displaying process without performing the pattern printing process.

\* \* \* \* \*